US012278432B2

(12) United States Patent
Lindenmeier et al.

(10) Patent No.: US 12,278,432 B2
(45) Date of Patent: Apr. 15, 2025

(54) COMBINATION ANTENNA FOR MOBILE COMMUNICATIONS AND SATELLITE RECEPTION

(71) Applicant: FUBA Automotive Electronics GmbH, Bad Salzdetfurth (DE)

(72) Inventors: Stefan Lindenmeier, Gauting (DE); Heinz Lindenmeier, Planegg (DE)

(73) Assignee: FUBA Automotive Electronics GmbH, Bad Salzdetfurth (DE)

( * ) Notice: Subject to any disclaimer, the term of this patent is extended or adjusted under 35 U.S.C. 154(b) by 111 days.

(21) Appl. No.: 18/137,703

(22) Filed: Apr. 21, 2023

(65) Prior Publication Data

US 2024/0195064 A1 Jun. 13, 2024

(30) Foreign Application Priority Data

Apr. 25, 2022 (DE) ........................ 102022001407.6

(51) Int. Cl.
*H01Q 5/40* (2015.01)
*H01Q 1/42* (2006.01)
*H01Q 9/42* (2006.01)

(52) U.S. Cl.
CPC ................ *H01Q 5/40* (2015.01); *H01Q 1/42* (2013.01); *H01Q 9/42* (2013.01)

(58) Field of Classification Search
CPC ............... H01Q 5/40; H01Q 1/42; H01Q 9/42
See application file for complete search history.

(56) References Cited

U.S. PATENT DOCUMENTS

| | | | |
|---|---|---|---|
| 5,506,592 | A | 4/1996 | MacDonald |
| 2010/0103070 | A1 | 4/2010 | Coupez |
| 2011/0215978 | A1 | 9/2011 | Lindenmeier |
| 2014/0285387 | A1 | 9/2014 | Lindenmeier |
| 2017/0025766 | A1 | 1/2017 | Su |

FOREIGN PATENT DOCUMENTS

| | | | |
|---|---|---|---|
| EP | 2784874 | A2 | 10/2014 |

OTHER PUBLICATIONS

European Search Report dated Sep. 19, 2023 corresponding to Eurpoean Application No. 23168673.4, 4 pages.

*Primary Examiner* — Graham P Smith
(74) *Attorney, Agent, or Firm* — Dickinson Wright PLLC

(57) ABSTRACT

A combination antenna for 5G mobile communications and satellite reception for vehicles comprises, above a common horizontal electrically conductive base surface, at least one broadband monopole antenna for the 5G frequency range, which has a monopole connection point, and a ring-shaped satellite reception antenna arranged concentrically thereto.

17 Claims, 23 Drawing Sheets

Kink lines

COMBINATION ANTENNA FOR MOBILE COMMUNICATIONS AND SATELLITE RECEPTION

CROSS-REFERENCES TO RELATED APPLICATIONS

This application claims the benefit of German Patent Application No. 102022001407.6, filed on Apr. 25, 2022, the disclosure of which is hereby incorporated by reference in its entirety.

The invention relates to a combination antenna 0 for 5G mobile communications and satellite reception for vehicles, comprising, above a common horizontal electrically conductive base surface 6, at least one vertical broadband monopole antenna 1 for the 5G frequency range 6 having a ring-shaped satellite reception antenna 2 arranged concentrically thereto.

Locating satellite radio signals are as a rule transmitted using circularly polarized electromagnetic waves due to polarization rotations on the transmission path and are used in all known locating satellite navigation systems. Modern navigation systems provide for an evaluation of the simultaneously received radio signals of a plurality of locating satellite navigation systems, in particular for global availability in conjunction with high navigation accuracy in mobile navigation. Such systems that receive in combination are subsumed under the name GNSS global navigation satellite system and include known systems such as GPS Global Positioning System, GLONASS, Galileo and Beidou, etc. Locating satellite antennas for navigation on vehicles are as a rule configured on the electrically conductive outer skin of the vehicle body. In particular those antennas which are characterized by a low construction height in conjunction with a cost-effective manufacturing capability are suitable for setup on vehicles. For example, they in particular include the ring line radiator known from DE102009040910, configured as a resonant structure, and having a small construction volume that is in particular an absolute requirement for mobile applications. The antenna has a small base surface and is very low with a height of less than one tenth of the free-space wavelength.

A particular challenge for the locating satellite antennas for GNSS comprises the demand for a large frequency bandwidth that is, for example, predefined for GPS by the frequency band L1 having the center frequency 1575 MHz required bandwidth approximately 80 Hz and by the frequency band L2 having the center frequency 1227 MHz required bandwidth approximately 53 MHZ. Systems for the simultaneous evaluation of signal contents in the frequency bands L1=1535 MHz-1615 MHz and L2=1200 MHZ-1253 MHz place particularly high demands on the antennas. And this with a small available installation space, as is always the case, above all in vehicle construction.

The use of separate antennas located in close proximity to one another for the two frequency bands includes the problem of mutual electromagnetic coupling with the effect of influencing the directional diagrams and the polarization purity and in particular the cross-polarization. This results in the particular problem of designing a combination antenna 0 for mobile communications and locating satellite reception. Even with sufficient gain in the desired, typically right-hand circular polarization direction RHCP of the suppression, the opposite polarization direction—the cross-polarization LHCP—acquires crucial importance with respect to correct locating results. The accuracy of the locating result is thus particularly influenced by the ratio of the desired polarization direction to the cross-polarization of the locating satellite antenna, that is by the cross-polarization spacing.

The smallest interfering influences by the electromagnetic coupling of the mobile radio antenna on the locating satellite antenna leads to notable navigation errors. A particular challenge for the design of a combination antenna of this kind is in particular also posed by the requirement of the automotive industry for as small as possible an outline footprint of the combination antenna on the car body in conjunction with the requirement for a very small height of the combination antenna. As a basic requirement, the demand for a low-effort and thus economical manufacture of the combination antenna is of exceptional importance. The reception undisturbed by mutual electromagnetic coupling is likewise essential for the other satellite radio services broadcasting in the frequency range between 2.2 GHz and 2.5 GHz.

A combination antenna consisting of a satellite reception antenna and a mobile radio monopole designed from a conductive film is known from EP 2 784 874 A2. The mobile radio monopole specified there projects over the satellite antenna by an order of magnitude and is unsuitable due to the required small antenna height. Mass production is also more complex.

The present invention is therefore associated with the object of specifying a combination antenna that is economically less costly to manufacture, that is powerful for mobile communications in the 5G mobile communications frequency range at a very low overall height of between 1 cm and 5 cm and a small maximum footprint transverse extent of between 4 cm and 8 cm on the vehicle outer skin, and that also provides low-cross-modulation satellite navigation reception for obtaining accurate locating results or satellite reception true to the directional diagram for other satellite radio services in a vehicle.

This object is satisfied by the features of claim 1.

A combination antenna 0 for 5G mobile communications and satellite reception for vehicles is disclosed, comprising, above a common horizontal electrically conductive base surface 6 as ground, at least one vertical broadband monopole antenna 1 having the height hm for the 5G frequency range 6 and having a ring-shaped satellite reception antenna 2 arranged concentrically thereto, the combination antenna comprising at least one of the following features:

- The satellite reception antenna 2 is designed as a ring line radiator for a satellite frequency range having the free-space wavelength λ min of the highest satellite reception frequency by a closed ring line 2*a* at the height hr, where $hr/hm<0.75$, above the electrically conductive base surface 6 for RHCP satellite reception.
- The broadband monopole antenna 1 is formed as a rotationally symmetrical folding body from a number N, where $3<N<16$, of mutually substantially identical circular surface segments 5 composed of electrically conductive metal surfaces, each having the segment radius R,8, and the segment angle δ, 10, at the tip of the circular surface segment 5.
- The circular surface segments 5 are azimuthally uniformly distributed around the central line ZL of the combination antenna 0 extending in a perpendicular manner through the monopole connection point 3 in that the circular segment tips of all the circular surface segments 5 are connected to one another, by which circular segment tips the monopole connector 3*a* and, together with the ground connector 3*b* on the conductive base surface, the monopole connection point 3 are jointly formed.

Each circular surface segment 5 is arranged, starting from its tip, in a first section A1,15 such that its surface normal intersects the central line ZL and adopts the deflection angle θ, 10 against this line so that the surfaces of the circular surface segments 5 approximately span the cone jacket of a cone standing perpendicular on the tip at the monopole connection point 3.

To form as large as possible an areal monopole roof capacity 4, each circular surface segment 5 is bent radially outwardly in the second section A2,16 along a bending line BL1,14 located at the monopole height 1 cm<hm<5 cm above the conductive base surface 6 such that the circular surface segment 5 is guided substantially in parallel with the base surface 6 in this second section A2,16.

The segment opening angle δ, 10, the segment radius R, 8 and the deflection angle θ, 10 as well as the cutting of the segment width BS, 9 are matched to one another such that the outline GS, 11 of the satellite reception antenna 2 is covered at least 80% by the outline GD, 11*a* of the monopole roof capacity 4 and it applies to the maximum width BS, 9 of the circular surface segments 5 along the azimuth angle at every point:

BS,9$<\frac{1}{8}\lambda$ min.

Advantageous embodiments of the invention are set forth in the dependent claims, in the description, and in the drawings.

The segment opening angle δ, 10 and the deflection angle θ, 7 can be matched to one another such that the angle ε, 10*a* remaining in the first section A1,15 between adjacent circular surface sides of the circular surface segments 5 disappears so that these sides merge into one another. An N-angled regular pyramid that forms the antenna connector 3*a* with its apex and that has a closed electrically conductive jacket surface, whose largest periphery Upyr is smaller than 0.8*λ min, can thereby be formed.

The broadband monopole antenna 1 can be manufactured as a folding body from a planar, self-supporting electrically conductive film.

the folding body can be formed from a circular cutout having the segment radius R,8 from the film or from sheet metal.

circular surface segments 5 uniformly distributed over the azimuth—around the central line ZL perpendicular at the circle center—and having the segment radius R,8 and the segment opening angle δ, 10 can be formed from the circular cutout by a film cutout N.

the circular surface segments 5 can be connected at their tips via a central surface element A0 19 as a monopole connector 3*a*.

the angle bisectors WH 12 of the circular surface segments 5 can be rotated about their tips such that they are angled out with respect to the central line ZL by the deflection angle θ 7.

the circular surface segments 5 can—starting from their tips—in a first section A1,15 in each case be nestled against the cone jacket, virtually spanned by the angle bisectors WH 12, of the cone jacket standing perpendicular on the tip at the monopole connection point 3.

a cone apex/pyramid apex can be manufactured as a monopole connector 3*a* by mechanical deep-drawing of the central surface element A0,19.

a second section A2,16 can be formed in that each circular surface segment 5 is bent radially outwardly along a first bending line BL1,14 that is perpendicular to the angle bisector WH of said circular surface segment 5 and that is located at the monopole height hm above the conductive base surface 6.

The central surface element A0,19 can be approximately circular within the first section A1,15 and its radius RA0 56 can be designed such that its periphery does not exceed 0.8*λ min so that the periphery of the conical body formed therefrom by mechanical deep-drawing does not exceed this value at any point.

The folding body can be manufactured in the following steps.

The planar circular film cutout 29 having the segment radius R,8 can be cut by a cutting process such that the number N of azimuthally uniformly distributed circular surface segments 5 are present around its center Z that are connected at their tips via a minimal approximately circular film point for forming the monopole connector 3*a*.

To form the folding body, a tool for a rotationally symmetrical embossing deep-drawing process 22 can be present at the planar cut film cutout 29, consisting of an embossing stamp upper part 20 and an embossing stamp lower part 23, each having a circular, horizontal embossing surface 26 located radially outside, with an embossing cone 25 in the embossing stamp upper part 20 and a mutually complementary funnel having a conical jacket surface 24 in the embossing stamp lower part 23, in each case with the same opening angle θ, 7 for forming the mutually identical opening angle of the monopole antenna 1.

The surface line of the embossing cone 25 and that of the funnel having a conical jacket surface 24 can each be selected in accordance with the design of the first section A1,15.

The surface line of the embossing cone 25 and that of the funnel having a conical jacket surface 24 can each be selected in accordance with the design of the first section A1,15 and the radial width of the circular ring of the horizontal embossing surface 26 can be selected in the embossing stamp upper part 20 and in the embossing stamp lower part 23 for the design of the section A2,16 in each case.

With a single embossing deep-drawing process 22 at the planar cut film cutout inserted between the embossing stamp upper part 20 and the embossing stamp lower part 23, the monopole antenna 1 can be completely manufactured as a folding body with its fan-like conical first section A1,15 and with the star-shaped roof capacity—designed by bending the second section A2,16 of each circular surface segment 5—and with the monopole connector 3*a*.

The monopole antenna 1 formed as a folding body from the self-supporting electrically conductive film can be provided with embossed stiffening grooves 36 to stiffen the film and to facilitate its conical shape.

To produce the embossed stiffening grooves 36, raised embossing grooves for sheet metal stiffening 27 can be present at the jacket surface of the embossing cone 25 and at the horizontal embossing surface 26 of the embossing stamp upper part 20. The mutually complementary recessed counter-grooves for sheet metal stiffening 28 can be formed on the conical jacket surface of the funnel 24 and on the horizontal embossing surface 26 of the embossing stamp lower part 23.

To adapt the outline GD11*a* of the monopole roof capacity 4 to an approximately rectangular antenna cover in its second section A2,16, circular surface segments 5*a* cut in accordance with a section line course 35 can be designed.

The cutting of the circular surface segments 5 at the planar film cutout 29 can be performed such that a cutting tool 32 having a cutting tool upper part 33 at the embossing stamp upper part 20 and a cutting tool lower part 34 at the embossing stamp lower part 23 is present at the tool for the embossing deep-drawing process 22. Immediately following the embossing deep-drawing process 22 in time, the shortening of the second section A2,16 of the circular surface segments 5*a* to be cut can be given by the cutting movement of the two cutting tools against one another.

To design a cone with a closed conical jacket surface 37 and the monopole connector 3*a* at the cone apex at the nadir of the monopole antenna 1, the cone can be designed by deep-drawing the central surface element A0,19. At the center Z of the central surface element A0,19, downwardly deflectable fastening pinnacles 31 can be present for fastening the monopole antenna 1 on a circuit board 40.

To increase the size of the monopole roof capacity 4, the circular surface segment 5 can be extended beyond the end of the horizontally guided second section A2,16 by a third section A3,17 by selecting a correspondingly larger segment radius R,8, whereby the ends of the second sections A2,16 can describe a second bending line BL2 38 at which in each case the third section A3,17 can be bent slightly downwardly inclined.

At least one circular surface segment 5*b* can deviate from the shape of the other circular surface segments 5 such that, adjacent to the third section A3,17, a fourth section A4,18 is formed that can be kinked at the connection separating line as a third bending line BL3 39 extending toward the conductive base surface 6 and is conductively connected to the latter at its lower end.

By appropriately shaping the fourth section A4,18 in conjunction with the serial interconnection of a frequency-dependent network 41, the connection to the conductive base surface 6 can be designed as frequency-dependent such that its impedance at the lower frequency band end of mobile communications is suitably low, increasing with increasing frequency, whereby the fourth section A4,18 is without influence at higher frequencies.

An areal roof star structure 44 can be present, consisting of the same number N of star-shaped areal roof circular surface segments 45 that start from a common central connection surface 49 and whose surfaces in the region of the second section A2,16 and the third section A3,17 of the circular surface segments 5 are in each case designed congruently thereto and can be guided in parallel thereover for capacitive coupling. At least one of the areal roof circular surface segments 45*b* can deviate from the other roof circular surface segments 45 such that, instead of its radial end, a further section A3D 52 is formed adjacent thereto that is kinked there at the bending line BL2*k*, 48 extending toward the conductive base surface 6 and that is conductively connected to the latter at its lower end.

A thin-walled plastic cover 46 can be present which directly covers the second section A2,16 and the third section A3,17 of the circular surface segments 5 and at whose outer surface the roof circular surface segment 45 is applied for capacitive coupling to these sections.

To observe the condition BS<Bs max, a radial slot 53 can be present in each case at approximately the broadside center of the circular surface segment 5 to reduce the widening width of the circular surface segment 5 in order to observe the condition BS<Bs max.

To increase the size of the roof capacity, a respective elongate roof pinnacle 54 can be designed longitudinally in the first section A1,15 of each circular surface segment 5 by an elongate pinnacle cutout 55 for bending out at the first bending line BL1,14 such that the surface of the roof pinnacle 54 extends in parallel with the conductive base surface 6.

Every other one of the circular surface segments 5 can be designed in the azimuthal order as a circular surface segment 5*c* having a smaller segment radius Rc,8*c* for the additional formation of a shortened conical fan structure for supporting high mobile radio frequencies.

A plastic cover 46 whose inner shape includes a funnel shape and whose inner surface includes a reproduction of the course of the areal structures of the monopole antenna 1 can be present as a mechanical carrier of the areal structures of the monopole antenna 1. The areal structures can be coated with an MID-compatible lacquer and can be printed thereover with the areal structures of the monopole antenna 1 with the electrically conductive MID structures 61. However, the areal conductive structures can also be manufactured by a bonded electrically conductive film.

The combination antenna 1 can be manufactured in an advantageous embodiment in accordance with claim 1 having the following features. The monopole antenna 1 can be designed with respect to a minimum radiation coupling with the satellite reception antenna 2 for the free-space wavelength $\lambda$ min=18.75 cm at the upper GNSS frequency band for the satellite reception antenna 2. There can be N=8 mutually identical circular surface segments 5. The monopole height hm can be selected as 0.1*$\lambda$ min. The deflection angle $\theta$, 7 can amount to $\theta$=30° and the segment radius R, 8 can amount to R=0.17*$\lambda$ min. The segment opening angle $\delta$, 10 can amount to $\delta$=15°. The conductive base surface 6 can be represented as an electrical circuit board 40.

The broadband monopole antenna (1) can be formed as a folding body and can be manufactured from a planar self-supporting electrically conductive film or from sheet metal.

The folding body can be formed from a circular sector cutout having the segment radius of the first section A1, 15 from the film.

To mark the N sectors, straight sector fold lines (63) can be provided, at each of which the film is kinked such that the closed jacket surface of an N-angled pyramid is formed.

The circular surface segments 5 can be designed with their second section A2, 16, their third section A3, 17 and with their fourth section A4, 18 as laterally cut triangular surface segments 5*d*.

However, instead of the kink at straight sector fold lines (63), the circular sector cutout can be designed by mechanical shaping such that, for better impedance matching at the highest frequencies, instead of the elevation contour of a pyramid with straight sides, the elevation contour at the antenna connection point 3 starting with a larger opening angle and smoothly transitioning to a smaller opening angle is provided so that, for instance, the bulgy structure of a vase is reproduced.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

Figure 1A:
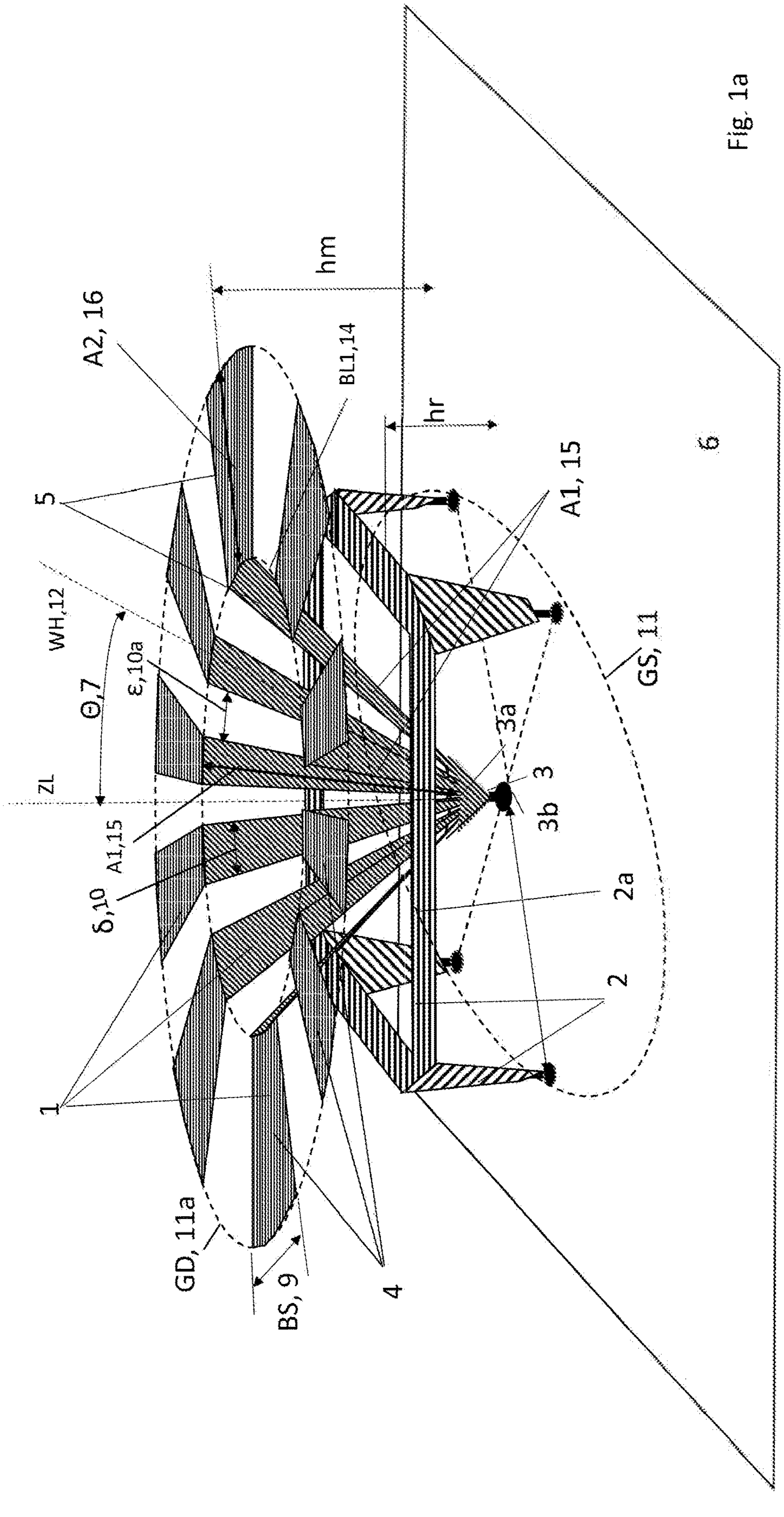
FIG. 1*a* shows a combination antenna comprising a monopole and a satellite reception antenna.

The invention will be explained in more detail in the following with reference to embodiments. The associated Figures show in detail:

FIG. 1:

a)

A combination antenna 0 consisting of a monopole antenna 1 having a satellite reception antenna 2 placed concentrically thereto as a ring line radiator having a closed ring line 2*a* with the ring line height hr for the current distribution of a propagating line wave above the electrically conductive base surface 6. The satellite reception antenna 2 is designed for satellite navigation reception in the GNSS frequency range 1200.5 MHz to 1616 MHz or for satellite frequency ranges between 2200 MHz to 2500 MHz. The height hr of the satellite reception antenna 2 is selected in the range 0.5 cm<hr<2 cm. The satellite antenna connection can advantageously take place at at least one of its vertical radiators.

The monopole antenna 1 in accordance with the invention is designed as a vertical radiator having a roof capacity for mobile communications in the 5G frequency range between 617 MHz and 5.9 GHZ. In the example, the radiator is formed as an N=10-leaf fan-shaped palm-like structure of mutually identical circular surface segments 5 composed of an electrically conductive film that are azimuthally uniformly distributed and that are connected at their lower tips. Due to the connected tips, the monopole connector 3*a* and, together with the ground connector 3*b*, the antenna connection point 3 of the monopole antenna 1 are formed at the center ZL.

The description of the fan-shaped, palm-like structure can equivalently also take place based on triangular surface segments 5, instead of by the circular surface segments 5, by analogously replacing the segment radius R,8 with the corresponding triangle height. By designing the individual leaves as circular surface segments 5 or triangular surface segments, it is ensured that the monopole antenna 1 has, at the monopole connector 3*a*, a fan-shaped pyramid apex or a cone apex that enables the impedance matching with the continuing circuit for the upper frequencies of the 5G frequency range. If N circular surface segments 5 are formed, the angle ε, 10*a* remaining between adjacent circular surface sides of the circular surface segments 5 results in the region of the first section A1,15 of a circular surface segment 5 at a sector angle of $2\pi/N$ and in the combination of the segment opening angle δ, 10 with the deflection angle θ, 7.

To form an areal monopole roof capacity 4, each circular surface segment 5 is bent radially outwardly in the second section A2,16 with respect to the central line ZL along a first bending line BL1,14 located at the monopole height 1 cm<hm<5 cm above the conductive base surface such that the circular surface segment 5 is guided in this second section A2,16 substantially in parallel with the base surface 6. The radial length of the second section A2,16 is selected via the segment radius R,8, the length of the resulting first section A1,15 and the deflection angle θ,10 such that the outline GS,11 of the satellite reception antenna 2 is at least completely covered by the outline GD,11*a* of the monopole roof capacity 4.

To avoid the impairment of the satellite reception by electromagnetic coupling of the satellite reception antenna 2 with the monopole antenna 1, the condition is to be observed—in accordance with the invention—that the width of the circular surface segments BS,9 is to be selected smaller than ⅛ of the shortest free-space wavelength of the received satellite signal. In this respect, it should in particular be ensured that in the region of the radial ends of the circular surface segments 5 their width BS,9 does not exceed the predefined value—in accordance with the invention—of ⅛ of the free-space wavelength λ min and circular surface segments 5 in this region are cut accordingly in their width to observe these conditions. Due to the small width of the second section A2,16 of the circular surface segments 5, no azimuthally directed currents caused by the radiation of the satellite antenna 2 can form that, on the other hand, affect the satellite antenna 2 and impair its function with respect to locating results or the radiation directional diagram. Even though the monopole antenna 1 completely covers the satellite reception antenna 2, the cover designed in accordance with the invention is practically transparent with respect to the radiation of the satellite reception antenna 2.

In the interest of forming a monopole roof capacity 4 that is as large as possible, the remaining angle ε, 10*a* should be selected as small as possible, wherein, on the other hand, the condition with respect to the width BS,9<0.125*λ min is to be observed, however.

In a particularly advantageous embodiment of the invention, the segment opening angle δ, 10 is selected such that the full sector angle 2π/N is used and a closed cone jacket or pyramid jacket with the maximum height hm of the monopole antenna 1 is formed in the first section A1,15 of the circular surface segments 5. In accordance with the invention, the condition for the periphery Upyr<0.8*λ min of said closed cone jacket or pyramid jacket additionally has to be observed in any case.

In a particularly advantageous embodiment of the invention, for a sector number N, the segment opening angle δ, 10 and the deflection angle θ, 7 can be selected to match one another such that the remaining angle ε, 10*a* disappears and adjacent circular surface sides contact one another so that a closed jacket surface of a cone or a pyramid is formed. Thus, in the lower region of the monopole antenna 1, the inductive and capacitive effects are balanced at high frequencies and an almost frequency-independent wave impedance—dependent on the segment opening angle δ, 10 and the deflection angle θ, 7 of the cone jacket or pyramid jacket—is formed. The height of the cone or of the pyramid can reach at most the height hm of the monopole antenna 2. In this case, to avoid the impairment of the satellite reception by electromagnetic coupling of the satellite reception antenna 2, the condition is to be observed that the periphery Upyr of the cone or of the pyramid does not exceed the value 0.8*λ min at any point, in particular at its upper end. In practice, preferred values for the height of the cone or of the pyramid are between 0.2*hm to 0.7*hm.

b)

Available space for the antenna in the form of a cuboid of interrupted lines with a square base surface of the available transverse extent and the available height hm—and a combination antenna 0 in accordance with the invention inscribed on said cuboid for consideration of the antenna potential.

FIG. 2:

a)

A circular sectional view or a cutaway view for a monopole antenna 1 in the combination antenna 0 in accordance with the invention. The design of the monopole antenna 1 is based on a planar, rigid but flexible metal film or plastic film with a metallic coating shown here by way of example, from which the circular surface segments 5 are cut out that are connected at their tips via a central surface element A0,19. The example shows N sectors with the angle 2π/N, each having a circular surface segment 5, the segment radius R,8 and its segment opening angle δ, 10 that is correspondingly smaller than 2π/N. Circular surface segments 5 uniformly distributed over the azimuth—around the central line ZL perpendicular at the circle center—are formed from the circular cutout by a film cutout N. The dotted circle with the radius RBL, 13 describes the first bending line BL1,14 that divides the segment radius R, 8 into a first section A1,15 and a second section A2,16. For the second section A2,16, the condition for the running width $$B(r)/\text{min}=2*r*\tan(/2)/\text{min}<0.125$$

is to be observed in accordance with the invention for the running radius r as the distance from the center.

b)

Elevation of the folded monopole antenna 1 in accordance with the invention, as at a). The angle bisectors WH 12 of the circular surface segments 5 in FIG. a) are rotated about their tips such that they are angled out in their first section A1,15 with respect to the central line ZL by the deflection angle θ, 7. In its second section A2,16, each circular surface segment 5 is modified such that it is bent radially outwardly along the first bending line BL1,14 with the radius RBL,13 in FIG. a) at the monopole height hm above the conductive base surface 6, whereby the radiating monopole roof capacity 4 is formed over all the second sections A2,16 of the circular surface segments 5. The covering, as required by the invention, of the outline GS,11 of the satellite reception antenna 2 by the outline GD,11*a* of the monopole roof capacity 4 is achieved at a predefined deflection angle θ, 7 and a predefined height hm of the monopole antenna 1 via the selection of the segment radius R,8*t*.

c)

If, for a number N of the circular surface segments, the segment opening angle δ, 10 and the deflection angle θ, 7 are selected such that the following relationship $$\frac{\tan(\delta/2)}{\sin(\theta)} < \tan\left(\frac{\pi}{N}\right) \quad (1)$$

is satisfied, there is no contact between adjacent triangular sides of the circular surface segments 5 and a separation angle ε, 10*a* remains between them. In this case, after the folding, a monopole antenna 1, as in FIG. 1, is given whose circular surface segments 5 extend separately from one another, starting from the monopole connector 3*a*.

The Figure shows a monopole antenna 1 in accordance with the invention in perspective, in which, for a number N of the circular surface segments 5, the segment opening angle δ, 10 and the deflection angle θ, 7 are selected such that in the first section A1,15 of the circular surface segments 5 the sides of adjacent circular surface segments 5 just contact one another so that in this section the closed pyramid jacket of an upside-down regular pyramid—in the specific example with the monopole height hm—with N side surfaces is formed. In this case, the two sides of the inequality (1) are of equal size and the following relationship exists between the segment opening angle δ, 10 and the deflection angle θ 7 for a selected number of circular surface segments N:

$$\theta = \arcsin\left(\frac{\tan(\delta/2)}{\tan(\pi/N)}\right) \quad (2)$$

In this example, to design the electrically closed pyramid jacket with the height hm, the sides that contact one another are conductively connected to one another by, for example, geometrically shaping and mechanically deep-drawing the electrically conductive film such that the pyramid jacket is given.

The description by circular surface segments 5 is here carried out by the functionally equivalent description by triangular surface segments 5*d*, wherein the segment radius R, 8 is replaced by the triangular segment height hs, 8*d* that only insignificantly deviates therefrom.

To avoid the interference of the satellite antenna 2 by electromagnetic coupling with the closed pyramid jacket, it is required in accordance with the present invention that the periphery of the pyramid jacket Upyr is not larger than 0.8*λ min at any point, with the largest periphery Upyr occurring at the monopole height hm. Thus, in accordance with the invention, the following relationship is required to be observed.

$$\frac{U_{Pyr}}{\lambda_{min}} = 2 * \frac{N * h_m}{\lambda_{min}} * \frac{1}{\cos(\theta)} * \tan\left(\frac{\delta}{2}\right) < 0.8 \quad (3)$$

This condition can be observed by selecting a correspondingly smaller height of the pyramid jacket than hm.

d)

A plan view of the exemplary antenna with the height of the pyramid jacket hm at c) with the bent-out second sections A2,16 of the circular surface segments 5 or the triangular surface segments 5*d* for designing the largest possible monopole roof capacity 4 and the antenna with its pyramid as the trunk and its sections A2,16 of the circular surface segments 5 as the leaves resembling a palm tree.

In accordance with the invention, the azimuthal width BS, 9 of the circular surface segments 5 of the monopole antenna 1 is to be selected smaller than ⅛ of the free-space wavelength λ min of the highest frequency of the satellite band. Due to the triangular surfaces opening in the radial direction with the segment opening angle δ, 10, this rule in particular applies to the end of the covering of the satellite antenna 2 by the monopole roof capacity 4, i.e. at the outline edge GD 11 for this example.

$$\frac{BS}{\lambda_{min}} = 2\frac{h_m}{\lambda_{min}} * \left[\frac{GD}{h_m} + \frac{1}{\cos(\theta)} - \tan(\theta)\right]\tan\left(\frac{\delta}{2}\right) < 0.125 \quad (4)$$

Figure 12A:
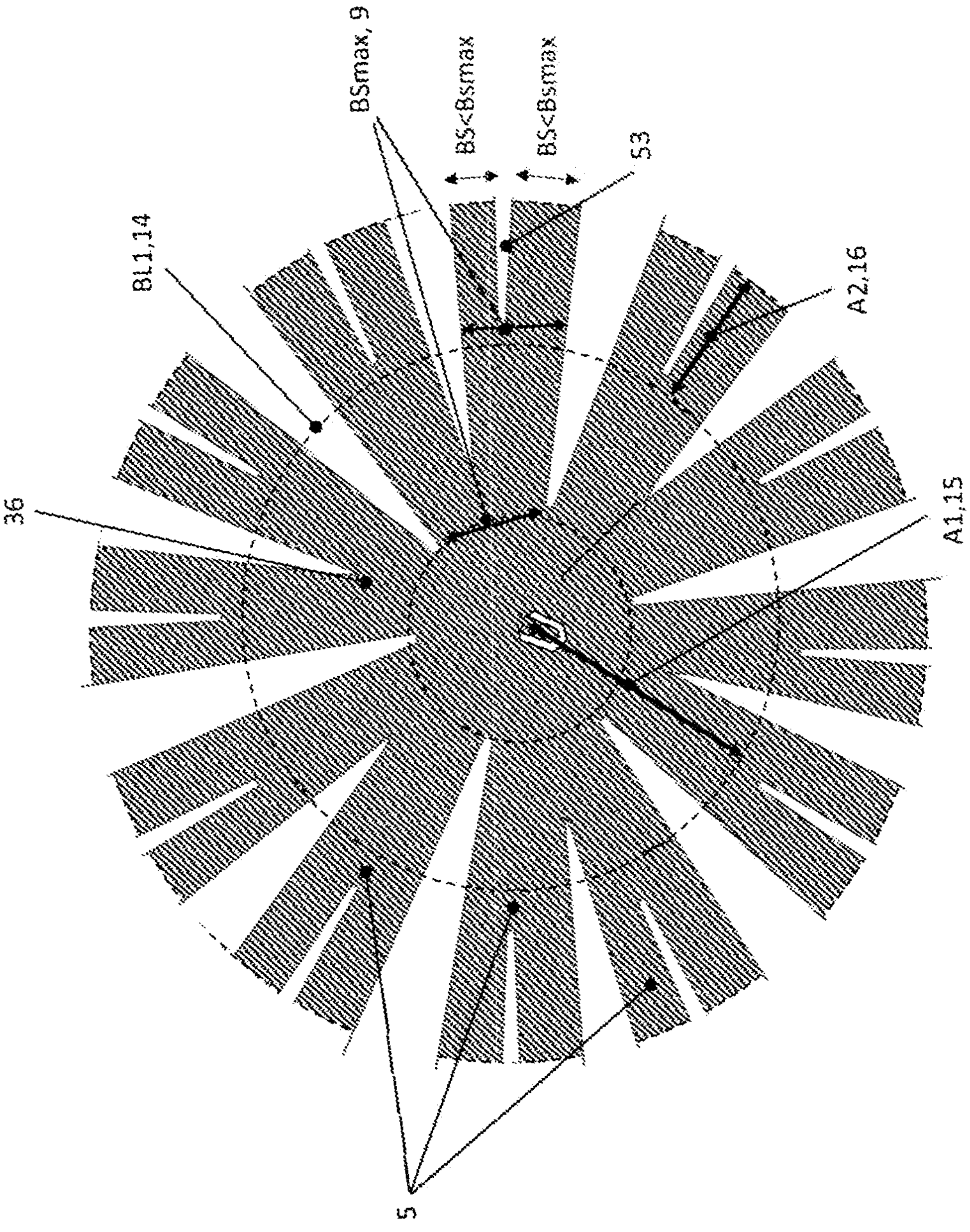
FIG. 12*a* shows a film cutout with radial slots.

If the inequality (3) cannot be observed, provision is made in accordance with the invention that the triangular surface segments 5 are, in their sections A2,16, each provided with radial slots 53, as explained in connection with FIG. 12*a*, or are accordingly laterally cut so that the maximum value of BS/λ min<0.125 applies for each cut triangular surface segment 5*d*.

From the structure of the monopole antenna 1 that is predefined in accordance with the invention, a remaining angle ε1, 10*b* generally results in each case between the adjacent circular surface sides of the circular surface segments 5 bent out in the second section A2,16. An overlapping of an adjacent circular surface segment 5 and a resulting harmful coupling of the monopole antenna 1 with the satellite antenna 2 is advantageously not given. With circular surface segments 5 not cut in their width, the remaining angle ε1, 10*b* results as follows for the monopole antenna 1 with a closed N-angled pyramid—i.e. while observing the relationship (1) or (2):

$$\varepsilon 1 = \frac{2\pi}{N} - 2\arctan\left(\sin(\theta) * \tan\left(\frac{\pi}{N}\right)\right) \quad (5)$$

e)

The following representations in FIGS. e) to h) refer by way of example to a combination antenna 0 with an outline GD, 11*a* of 3 cm and a height hm of the monopole antenna of 2 cm. In accordance with the relationship (1) or (2), a closed pyramid jacket with the height hm of the monopole antenna 1 is formed. The free-space wavelength of the highest frequency of the satellite band amounts to λ min=18.5 cm by way of example.

A representation of the relationship between the deflection angle θ,7 and the segment opening angle δ,10 of the circular surface segments 5 of the electrically conductive closed pyramid for a different number N of the circular surface segments or triangular surface segments in accordance with the above-mentioned relationships (1) and (2) respectively. The preferred range for the deflection angle θ<60° and for the segment opening angle δ<60° is indicated by the chain-dotted lines.

f)

Figure 12B:
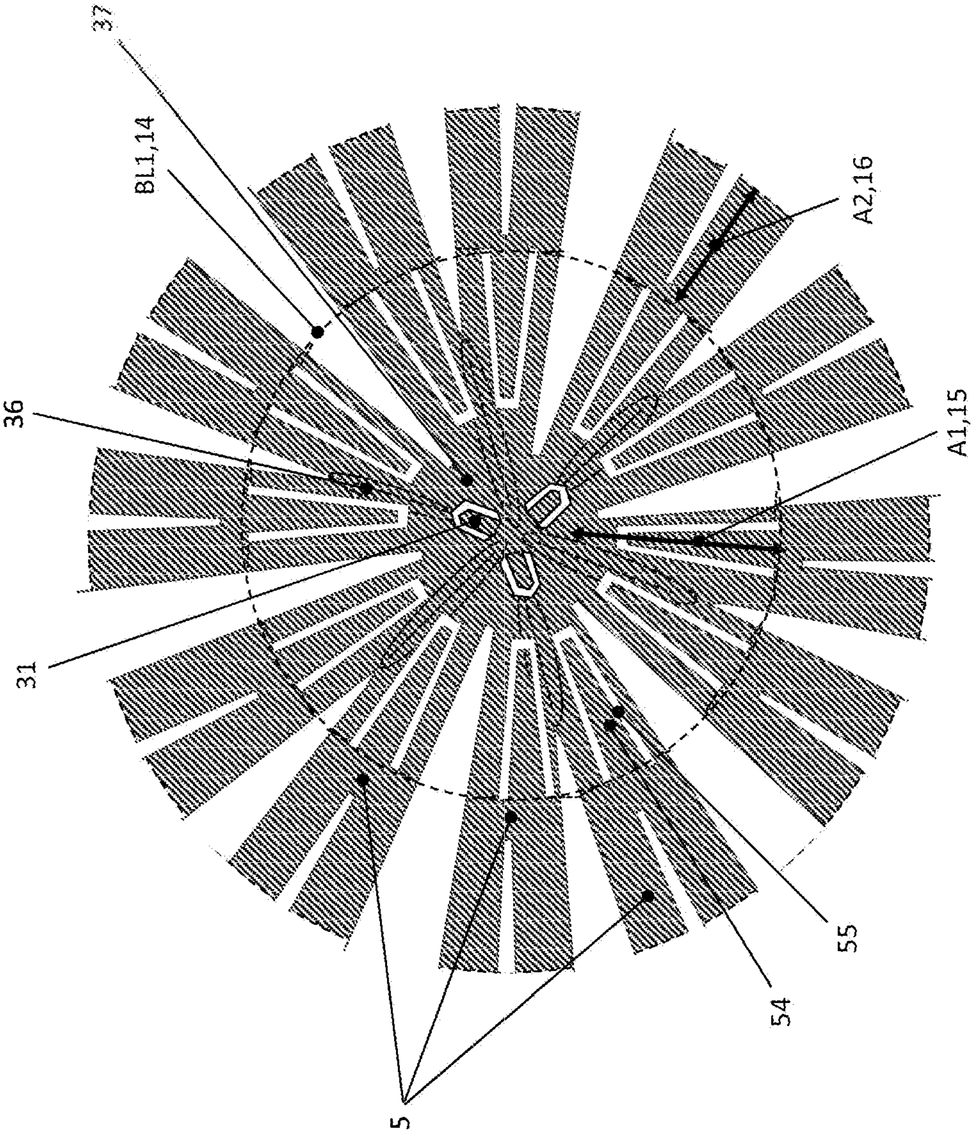
FIG. 12*b* shows a film cutout with roof pinnacles and radial slots.
Figure 13A:
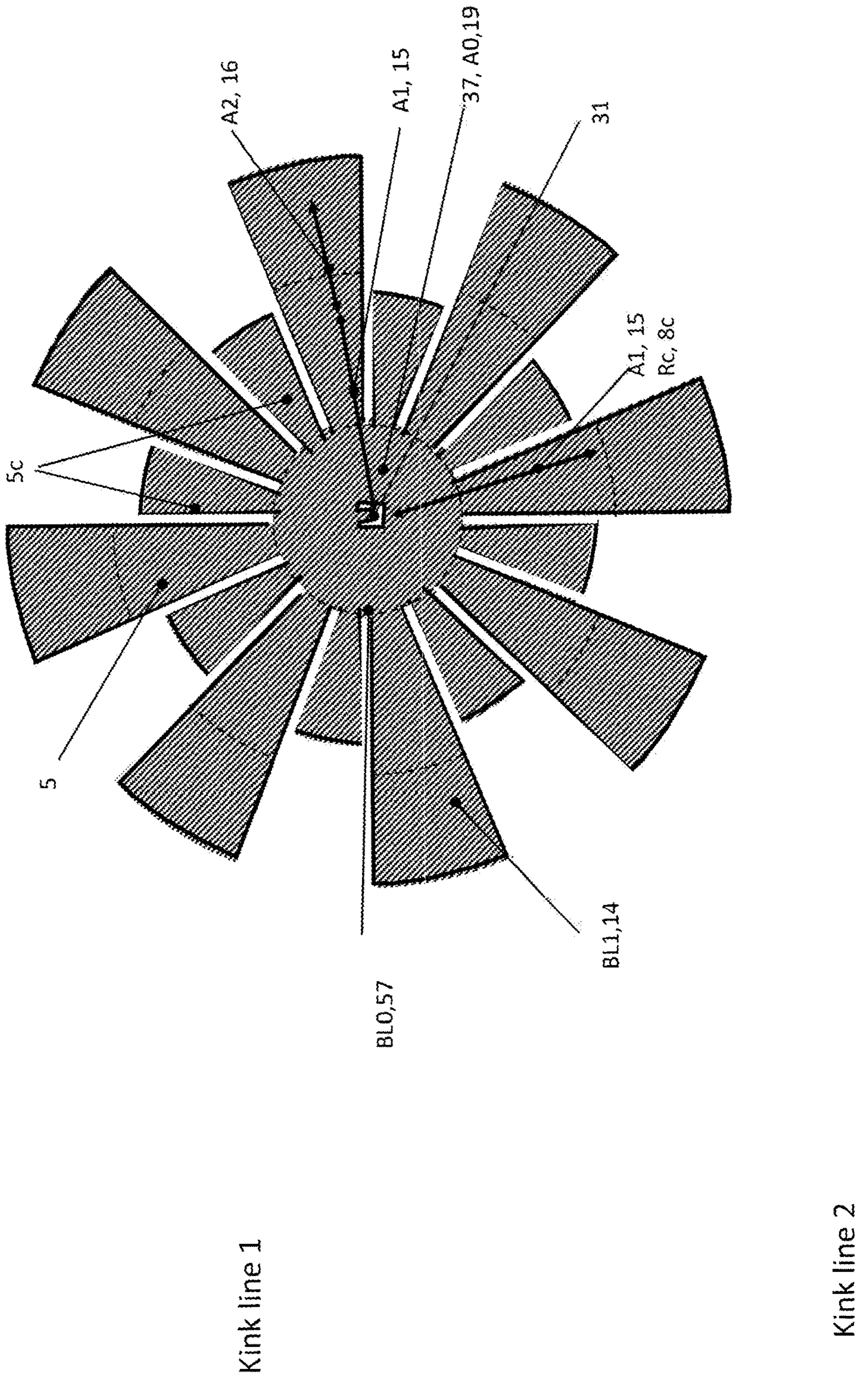
FIG. 13*a* shows a further film cutout for forming a cone.
Figure 13B:
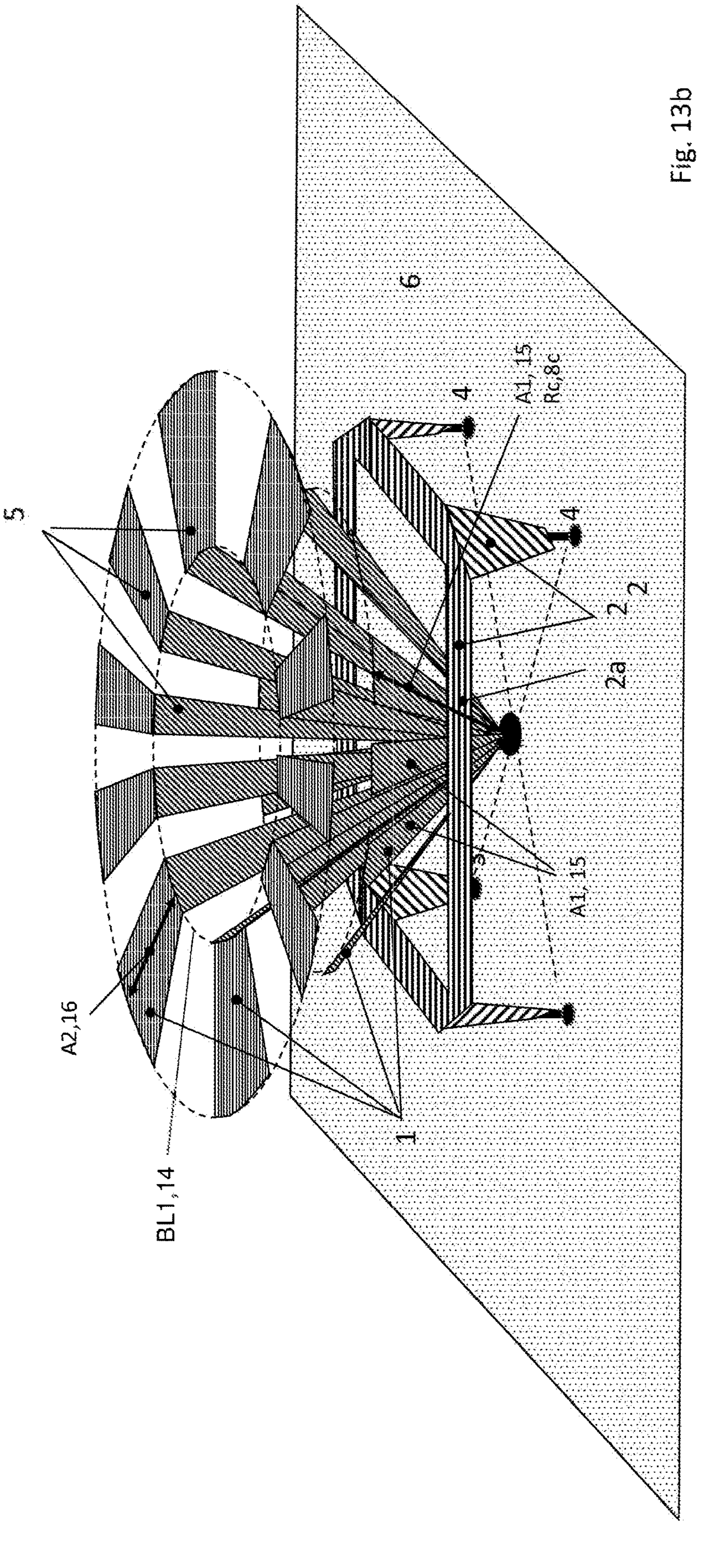
FIG. 13*b* shows a combination antenna for the 5G frequency range.

A representation of the relationship between the maximum width of the circular surface segments 5 (BS/λ min) at the radial end of the outline GD, 11*a*, said maximum width being related to the minimum free-space wavelength λ min at the maximum frequency of the satellite frequency band, and the deflection angle θ, 7 for several numbers N of circular surface segments. In accordance with the above-mentioned relationship (4) of the invention, BS/λ min<0.125 is required. From the diagram, it can be seen that when the dash-dotted line is exceeded at BS/λ min=0.125, the circular surface segments 5 are designed in accordance with the laterally cut triangular surface segment 5*d* or have a radial slot 53 at their radial end—as described in connection with FIG. 12—to observe the condition BS/λ min<0.125.

g)

Corresponding to the requirement BS/λ min<0.125, the maximum periphery Upyr of the closed pyramid jacket or cone jacket of the monopole antenna 1, which maximum periphery is related to λ min and occurs at the height hm, is also required—in accordance with the present invention—to be smaller than 0.8. The Upyr/λ min condition is given in the above-mentioned relationship (3) in dependence on the monopole height hm related to λ min, the deflection angle θ, 7, the segment opening angle δ, 10, and the number N of circular surface segments 5, i.e. the sectors. The observation of the condition (1) or (2) as a prerequisite for the closed pyramid jacket or cone jacket is assumed for this purpose. The curve developments shown in particular do not show a degradation of the properties of the satellite antenna 2, due to the radiation coupling with the closed pyramid jacket or cone jacket, for deflection angles θ, 7 of less than 45° and for a larger fanning out of the monopole roof capacity 4 of N>4.

h)

Figure 2B:
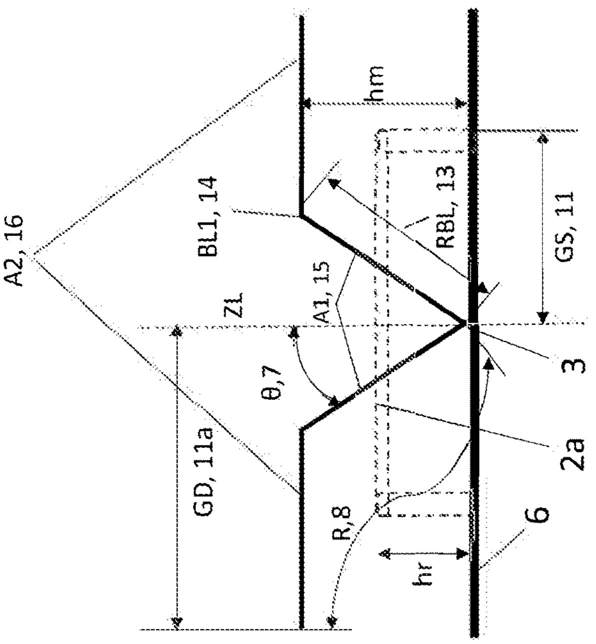
FIG. 2*b* shows an elevation for the monopole antenna of FIG. 2*a;*
Figure 2A:
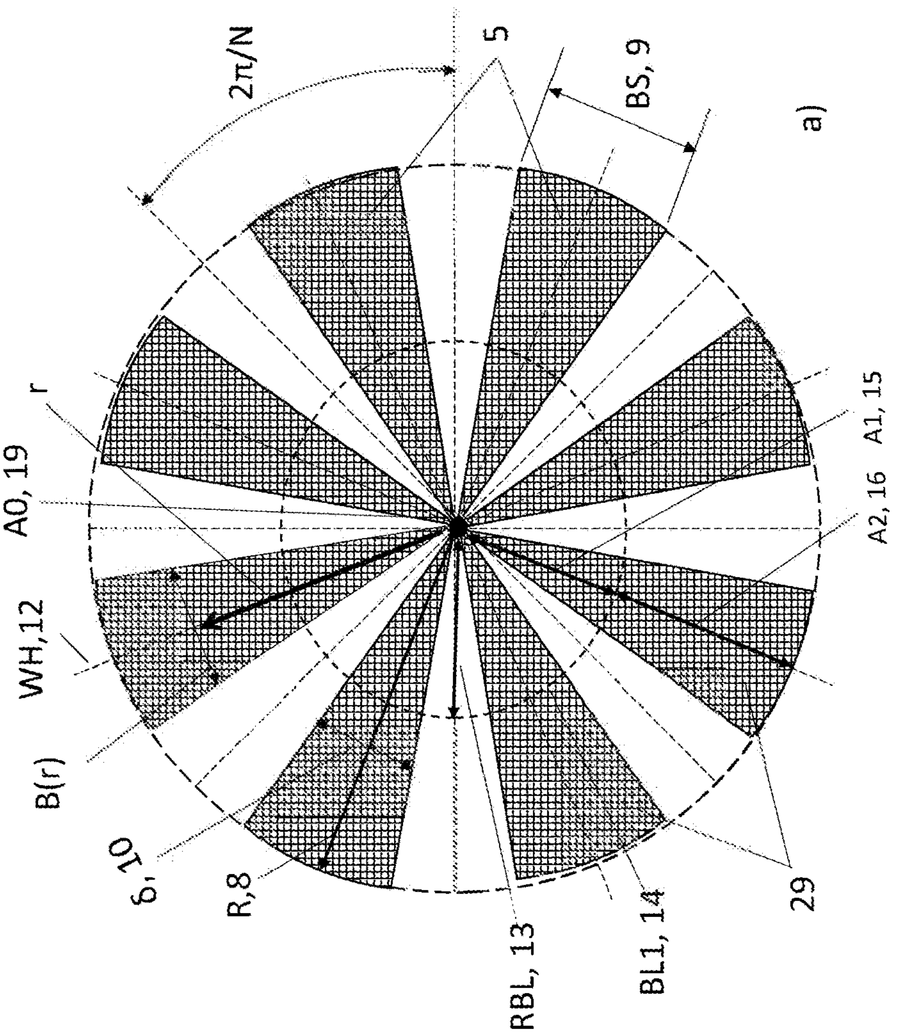
FIG. 2*a* is a circular sectional view or a cutaway view for a monopole antenna in the combination antenna in accordance with the invention.
Figure 2D:
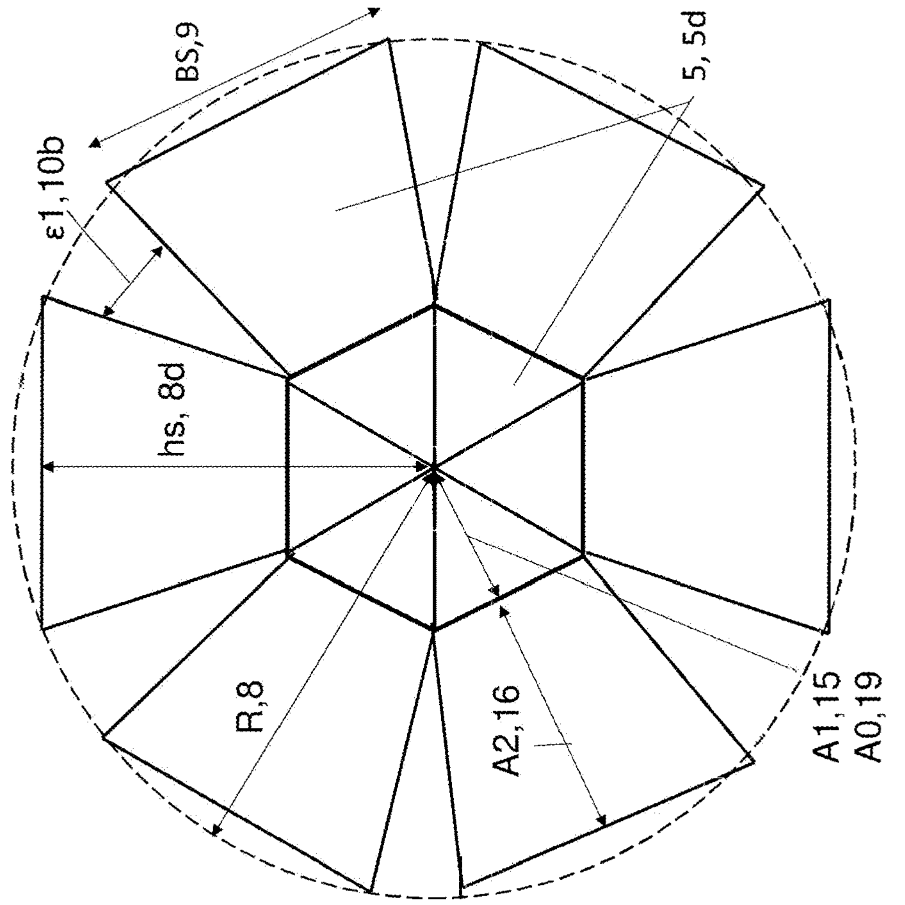
FIG. 2*d* shows a plan view of the antenna of FIG. 2*c;*
Figure 2C:
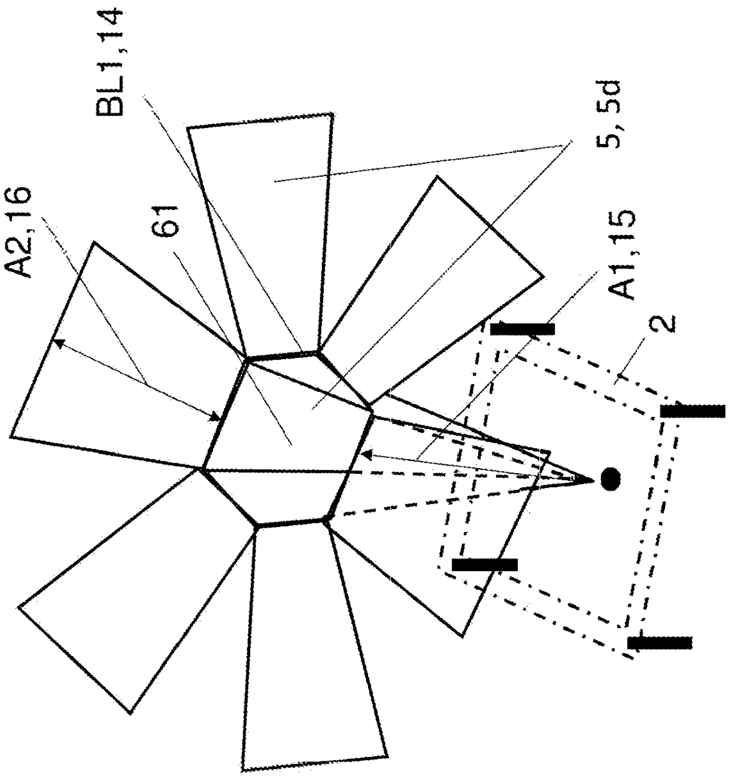
FIG. 2*c* shows a monopole antenna in perspective view.
Figure 2E:
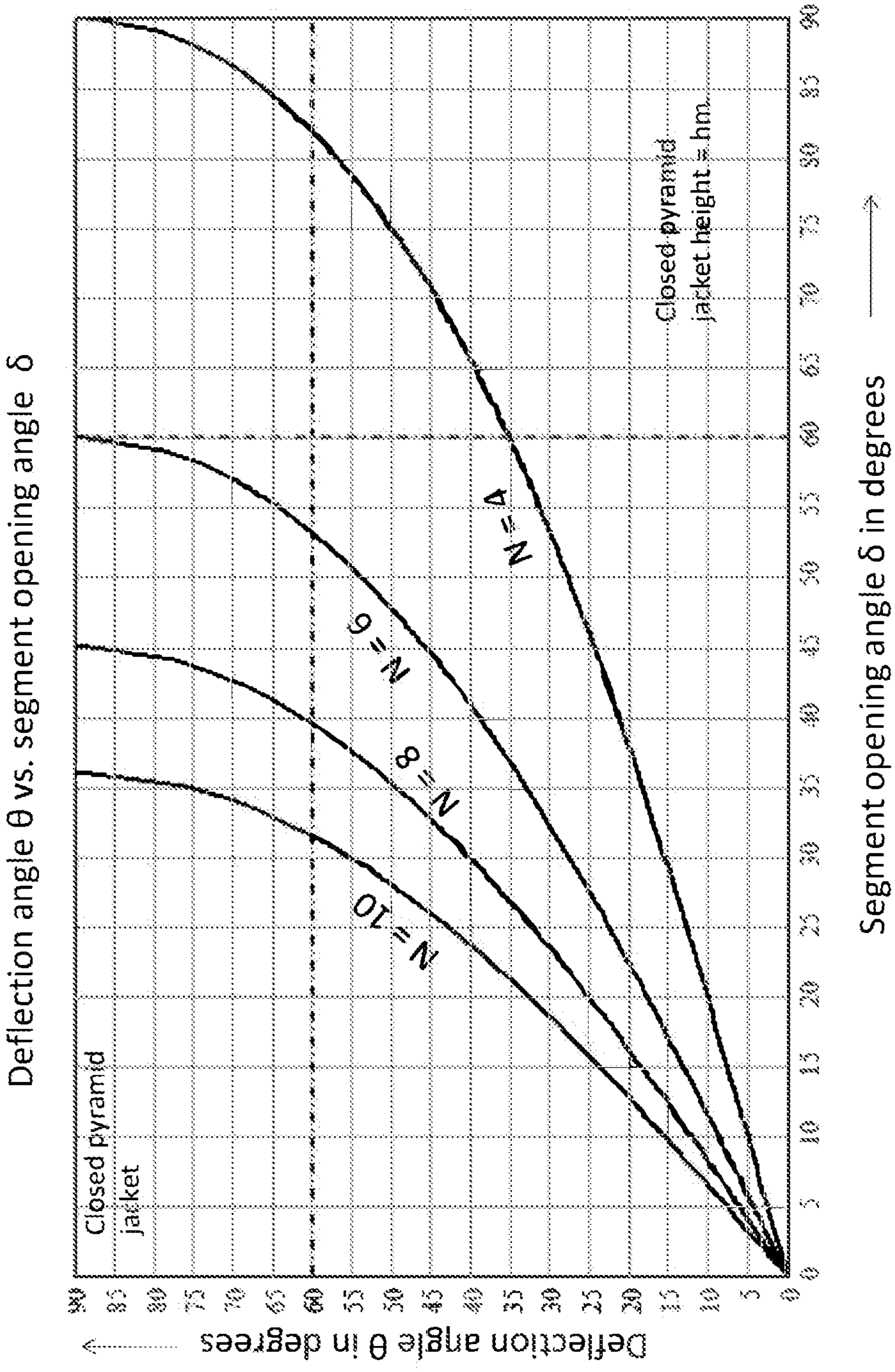
FIG. 2*e* shows a representation of the relationship between a deflection angle and a segment opening angle.
Figure 2F:
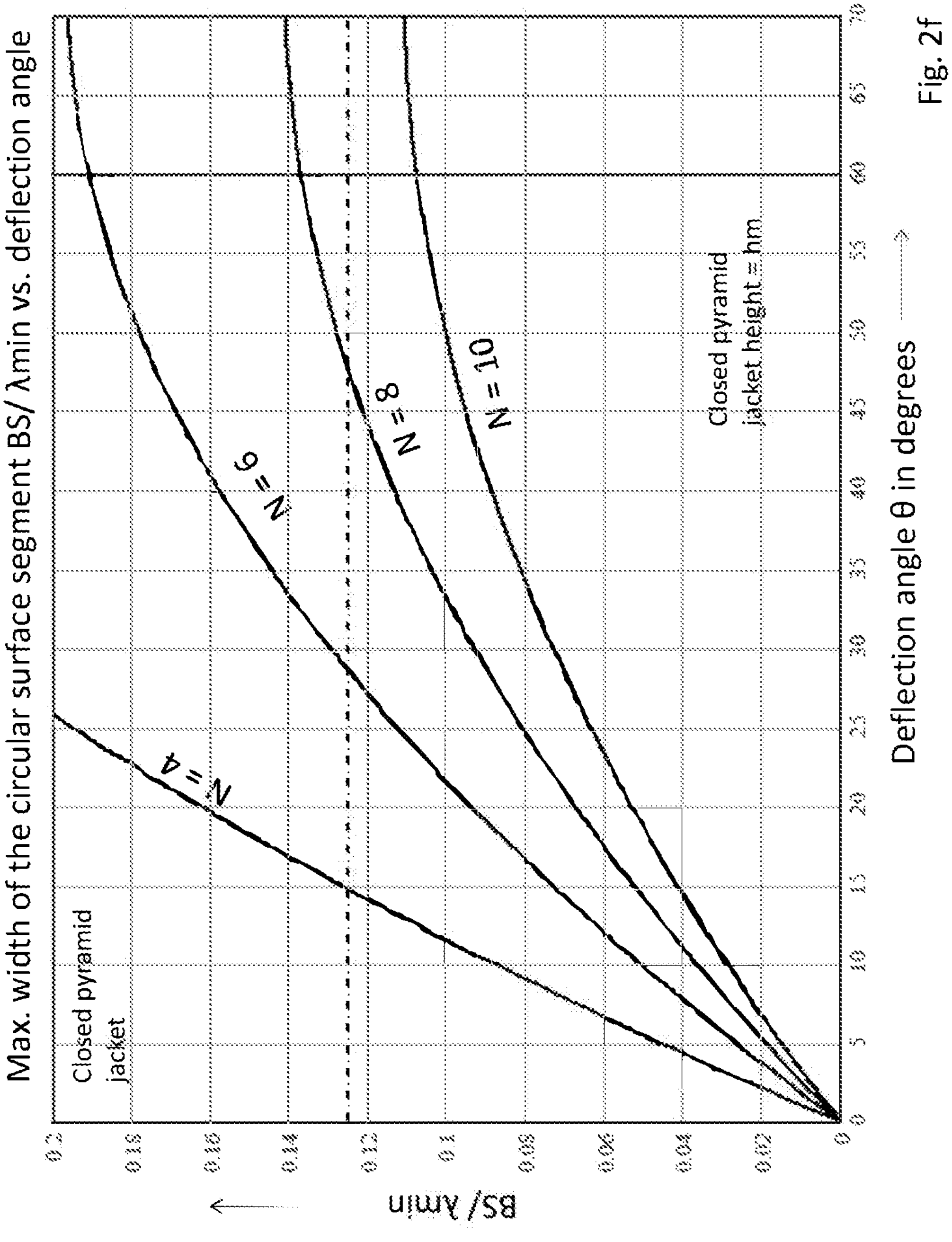
FIG. 2*f* shows a representation of the relationship between a maximum width of a circular surface segment and the deflection angle.
Figure 2G:
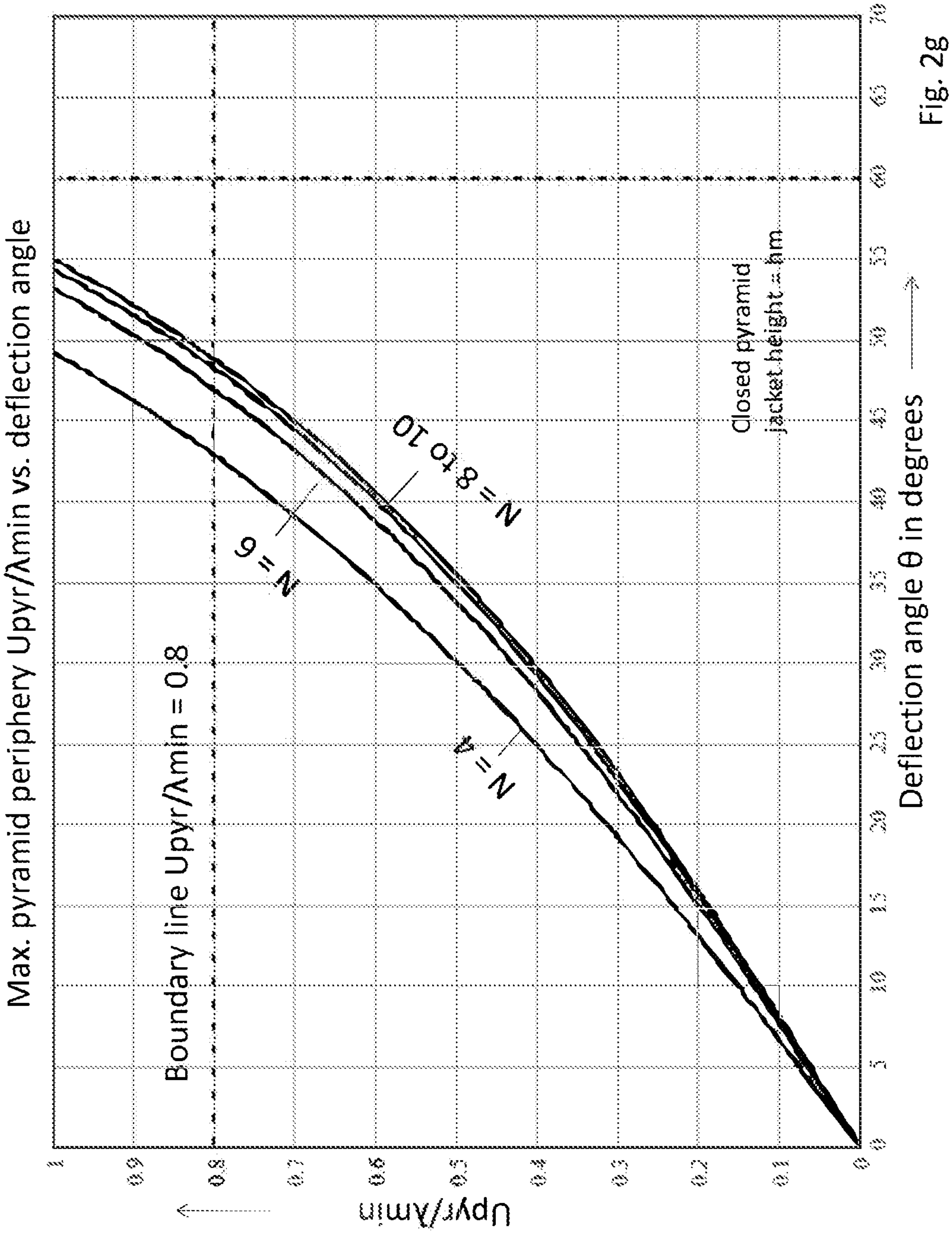
FIG. 2*g* shows a representation of the relationship between a maximum pyramid periphery and the deflection angle.
Figure 2H:
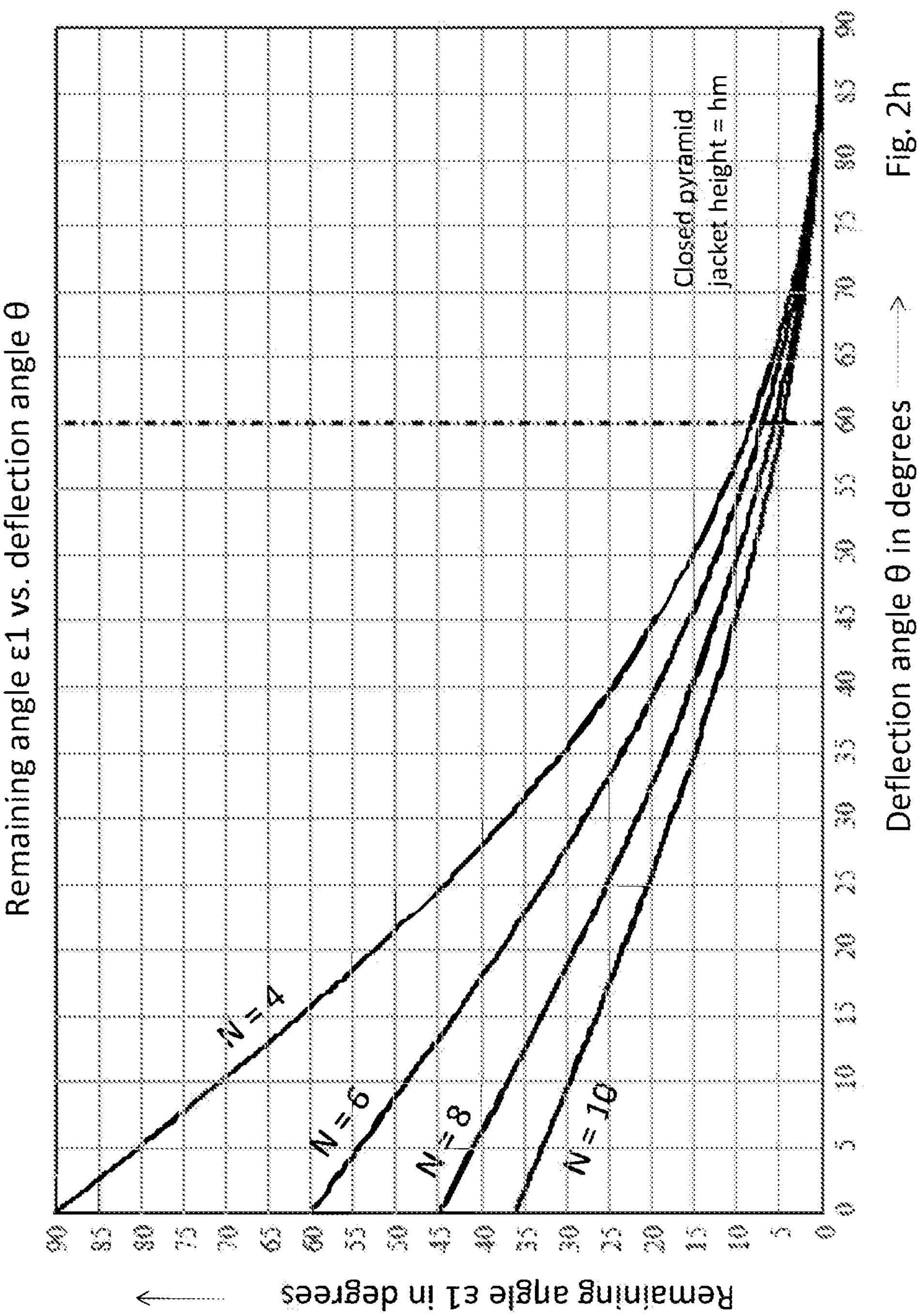
FIG. 2*h* shows a representation of the relationship between a remaining angle and the deflection angle.

A representation of the remaining angle ε1, 10*b* between the adjacent circular surface sides of the circular surface segments 5 bent out in the second section A2,16, as shown in FIG. 2*d*. The remaining angle ε1, 10*b* results from the above-mentioned relationship (5) and, even with a large fanning out by a large sector number N, yields sufficiently large values for the technically usable range for an effective separation of the mutually adjacent circular surface segments 5, in each case in their second section A2, 16. In conjunction with the observation of the conditions in relationship (4), only radially flowing currents are possible in these sections, while azimuthally flowing currents are suppressed by the separation. The particular advantage of the invention is hereby provided that enables the direct and complete covering of the satellite antenna 2 by the monopole roof capacity 4 and the resulting very small height hm of the combination antenna 0.

FIG. 3:

To increase the size of the monopole roof capacity 4, the circular surface segment 5 is extended beyond the end of the horizontally guided second section A2,16 by a third section A3,17 by selecting a correspondingly larger segment radius R,8, whereby the ends of the second sections A2,16 describe a second bending line BL2 38 at which in each case the third section A3,17 is bent slightly downwardly inclined in adaptation to the antenna cover.

For support in one of the circular surface segments 5, a fourth section A4,18 is formed adjacent to the third section A3,17, said fourth section A4,18 being bent at the connection separating line as a third bending line BL3 39 extending toward the conductive base surface 6 and being conductively connected to the latter at its lower end.

Figure 3A:
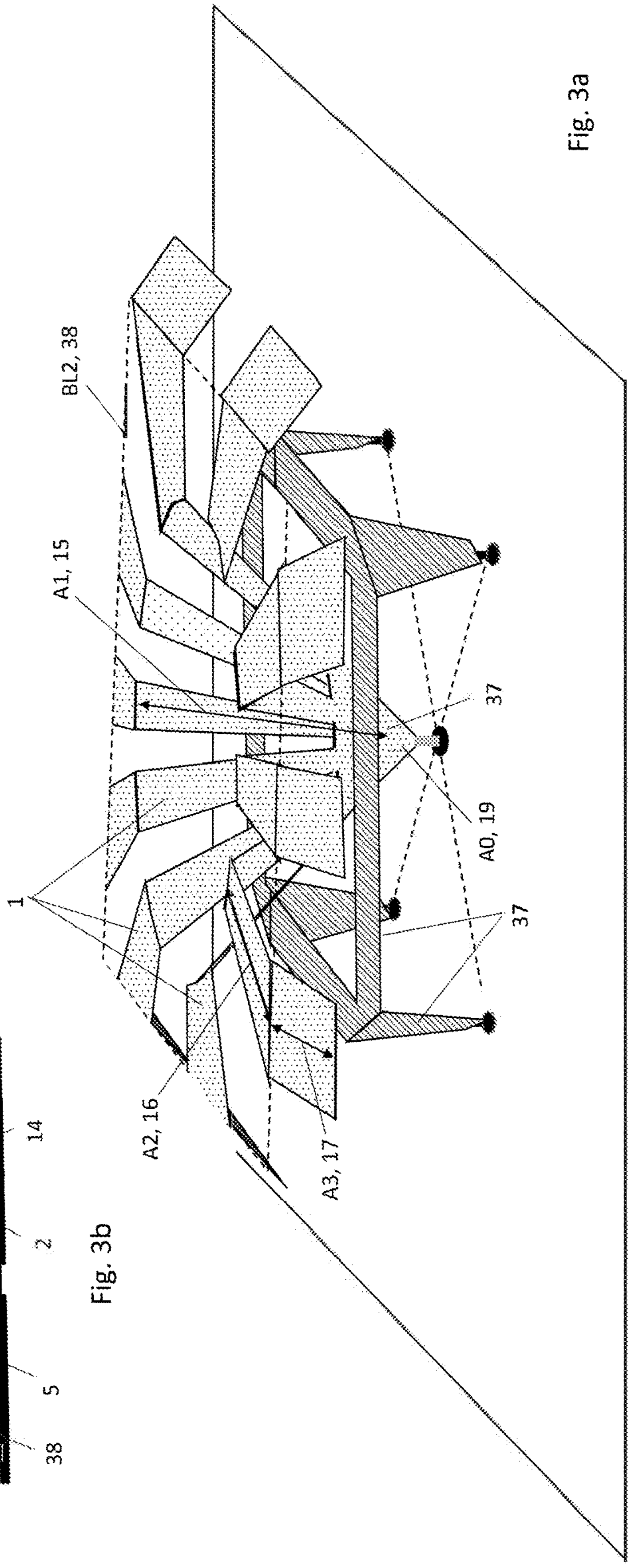
FIG. 3*a* shows another embodiment of a combination antenna.
Figure 3B:
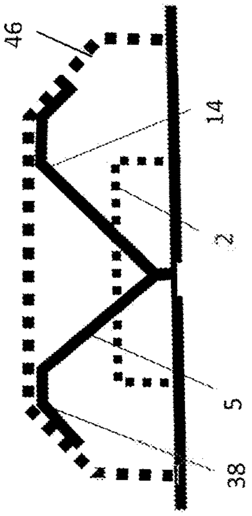
FIG. 3*b* shows additional detail of the antenna of FIG. 3*a;*

FIG. 4:

A combination antenna 0 in accordance with the invention as in FIG. 3, but with a circular surface segment with ground coupling 5*b* of the monopole antenna 1 that deviates from the other circular surface segments 5.

In deviation from the other circular surface segments 5, a fourth section A4,18 is formed adjacent to the third section A3,17, said fourth section A4,18 being bent at the connection separating line as a third bending line BL3 39 extending toward the conductive base surface 6 and being conductively connected to the latter at its lower end. An improvement with respect to the possible impedance matching at the lower 5G frequency band end, and thus an increase in the antenna potential, is associated with this measure.

Figure 4:
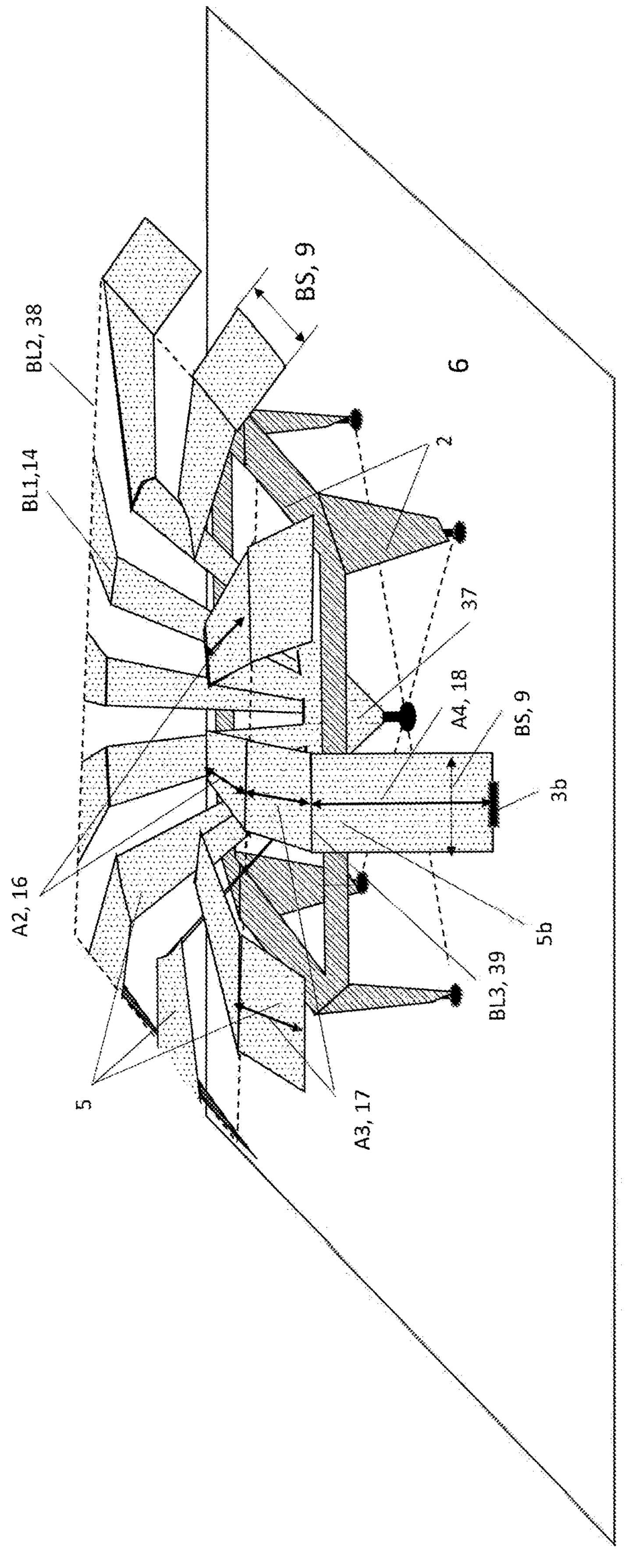
FIG. 4 shows a further embodiment of a combination antenna.

FIG. 5:

A combination antenna 0 in accordance with the invention as in FIG. 4, but with a correspondingly slim shape of the fourth section A4,18 of the circular surface segment with ground coupling 5*b* of the monopole antenna 1 and with the serial interconnection of a frequency-dependent network 41 for the design of the frequency dependence of the connection to the conductive base surface 6 such that the impedance of said connection is low at the lower frequency band end of the 5G frequency range—starting with 617 MHz—and increases with increasing frequency so that the fourth section A4,18 is without influence at higher frequencies. In the simplest case, the network 41 can consist of an inductor, whereby the desired improvement is achieved at the lowest frequencies and the fourth section A4,18 extending to the conductive base surface 6 becomes practically ineffective at higher frequencies. A transformation circuit 42 is connected downstream of the monopole connector 3*a* for impedance matching with the continuing circuit on the electrical circuit board 40.

The satellite antenna 2 with its ring line 2*a* and the vertical radiators is connected and energized via their connection points 43 on the circuit board.

FIG. 6:

a)

Figure 5:
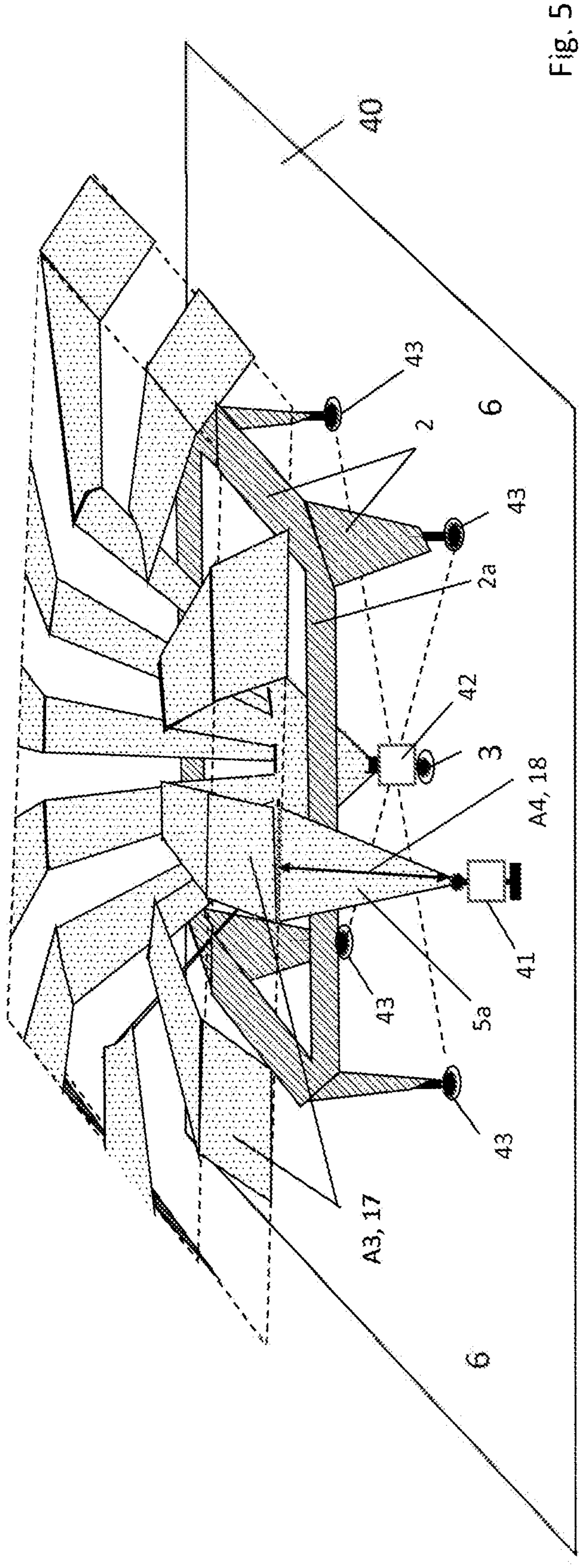
FIG. 5 shows a further embodiment of a combination antenna.

Combination antennas 0 in accordance with the invention as in FIG. 3, but with an additional areal roof star structure 44, consisting of the same number N of star-shaped areal roof circular surface segments 45 that start from a common central connection surface 49 and whose surfaces in the region of the second section A2,16 and the third section A3,17 of the circular surface segments 5 are designed to be congruent with them in each case and are guided parallel above them at a small distance for capacitive coupling. The roof star structure 44 is designed as a deep-drawn sheet metal part or as an electrically conductive film or an MID structure on the cover for capacitive connection to the sheet metal antenna. One of the areal roof circular surface segments 45*b* deviates from the other roof circular surface segments 45 such that, instead of its radial end, a further section A3D 52 is formed adjacent thereto that is kinked there at the bending line BL2*k*, 48 extending toward the conductive base surface 6 and that is conductively connected to the latter at its lower end. Via the roof star structure 44 coupled to the monopole roof capacity 4, there is an associated improvement, as described in FIGS. 4 and 5, with respect to the possible impedance matching at the lower 5G frequency band end and thus an increase in the antenna potential.

b)

A longitudinal section through an antenna as at a) with a side view of the third roof section A3D, 52. For a capacitive coupling of the roof star structure 44, the plastic cover 46 is thin-walled, but also provides the mechanical stability of the design. The electrical contact of the third roof section A3D, 52 with the conductive base surface 6 takes place at the mechanical connection of the plastic cover 46 to the conductive base surface 6 or to the electrical circuit board 40.

FIG. 7:

To manufacture the monopole antenna 1 for the combination antenna 0 in accordance with the invention, the following steps are provided for a rotationally symmetrical embossing deep-drawing process 22:

- The planar circular film cutout 29 in FIG. 2*a*) having the segment radius R,8 is cut by a cutting process such that the number N of azimuthally uniformly distributed circular surface segments 5 are present around its center Z that are connected at their tips via a minimal approximately circular film point for forming the monopole connector 3*a*.
- To form the folding body, a tool for a rotationally symmetrical embossing deep-drawing process 22 is present at the planar cut film cutout 29, consisting of an embossing stamp upper part 20 and an embossing stamp lower part 23, each having a circular, horizontal embossing surface 26 located radially outside, with an embossing cone 25 in the embossing stamp upper part 20 and a mutually complementary funnel having a conical jacket surface 24 in the embossing stamp lower part 23, in each case with the same opening angle θ, 7 for forming the mutually identical opening angle of the monopole antenna 1.
- The surface line of the embossing cone 25 and that of the funnel having a conical jacket surface 24 are in each case selected in accordance with the design of the first section A1,15.
- The surface line of the embossing cone 25 and that of the funnel having a conical jacket surface 24 are in each case selected in accordance with the design of the first section A1,15 and the radial width of the circular ring of the horizontal embossing surface 26 is selected in the embossing stamp upper part 20 and in the embossing stamp lower part 23 for the design of the section A2,16 in each case.
- With a single embossing deep-drawing process 22 at the planar cut film cutout inserted between the embossing stamp upper part 20 and the embossing stamp lower part 23, the monopole antenna 1 is completely manufactured as a folding body with its fan-like conical first section A1,15 and with the star-shaped roof capacity—designed by bending the second section A2,16 of each circular surface segment 5—and with the monopole connector 3*a*.

Figure 6A:
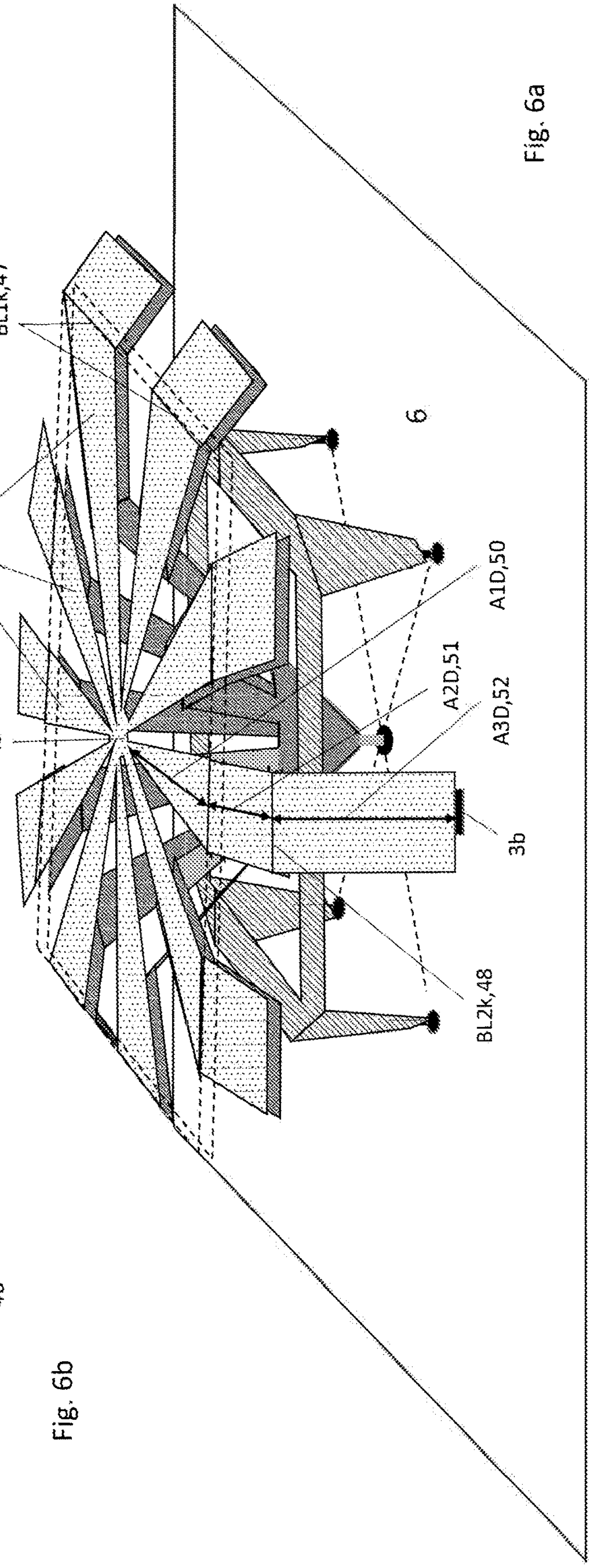
FIG. 6*a* shows a further embodiment of a combination antenna with an additional areal roof star structure.
Figure 6B:
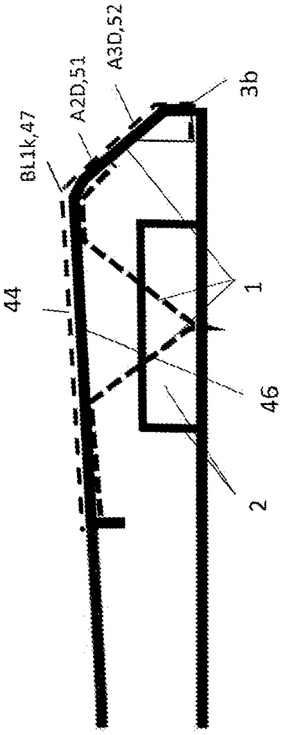
FIG. 6*b* shows a longitudinal section through the antenna of FIG. 6*a;*
Figure 7:
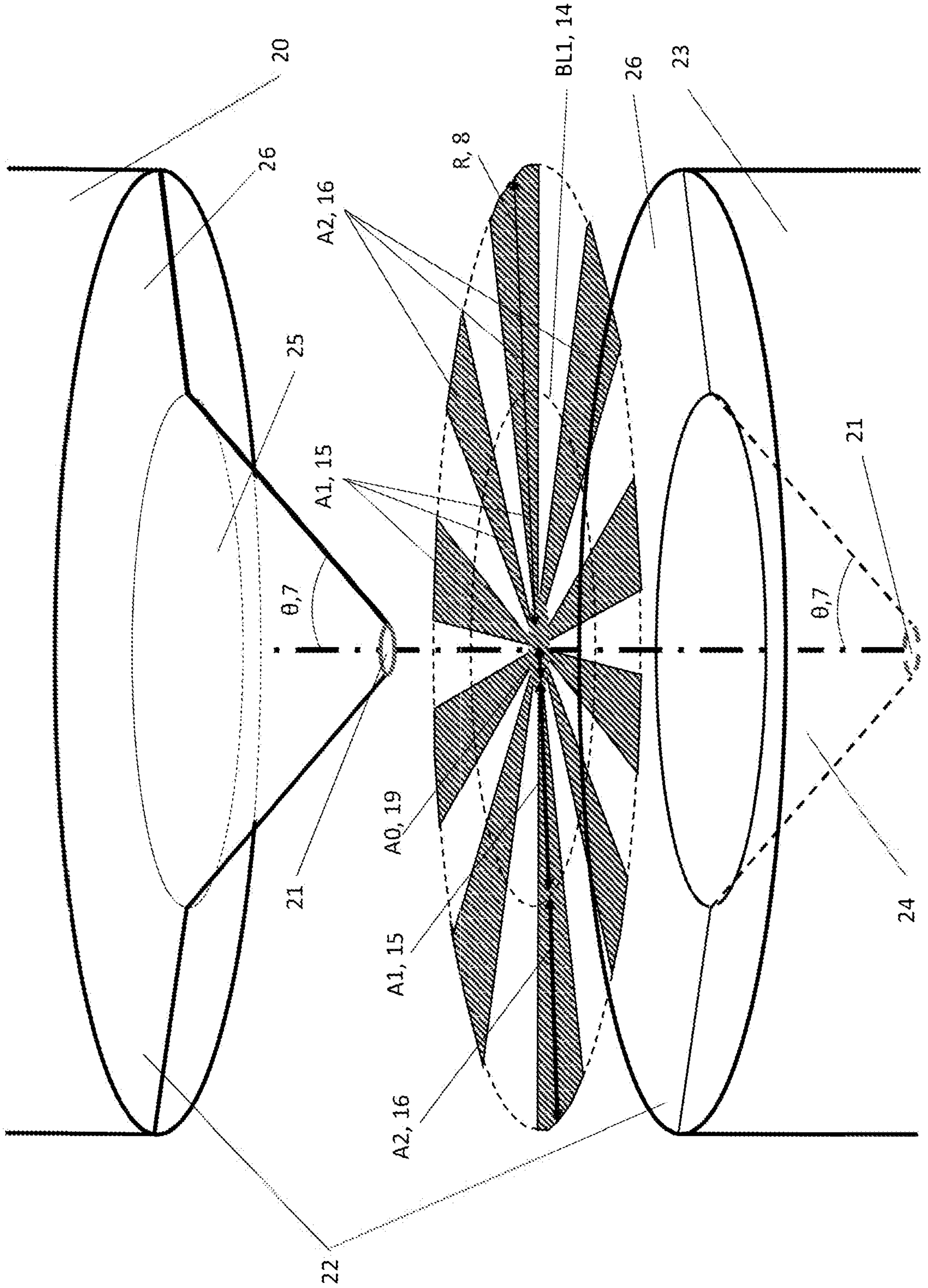
FIG. 7 illustrates components suitable to manufacture a monopole antenna.

FIG. 8:

A tool for a rotationally symmetrical embossing deep-drawing process 22 as in FIG. 6, but with raised embossing grooves for the sheet metal stiffening 27 at the jacket surface of the embossing cone 25 and at the horizontal embossing surface 26 of the embossing stamp upper part 20 and the mutually complementary recessed counter-grooves for the sheet metal stiffening 28 at the conical jacket surface of the funnel 24 and at the horizontal embossing surface 26 of the embossing stamp lower part 23. By carrying out the embossing deep-drawing process 22 at the film cutout 29, the monopole antenna 1 manufactured from the self-supporting, electrically conductive film and formed as a folding body is provided in a single workstep with embossed stiffening grooves 36 to stiffen the film and to facilitate its conical shape.

FIG. 9:

A combination antenna 0, as in FIG. 1, with an adapted outline GD11*a* of the monopole roof capacity 4 to an approximately rectangular antenna cover. For this purpose, the circular surface segments 5 are cut in their second section A2,16 in accordance with a section line course 35 and are marked as cut circular surface segments 5*a*.

Figure 9:
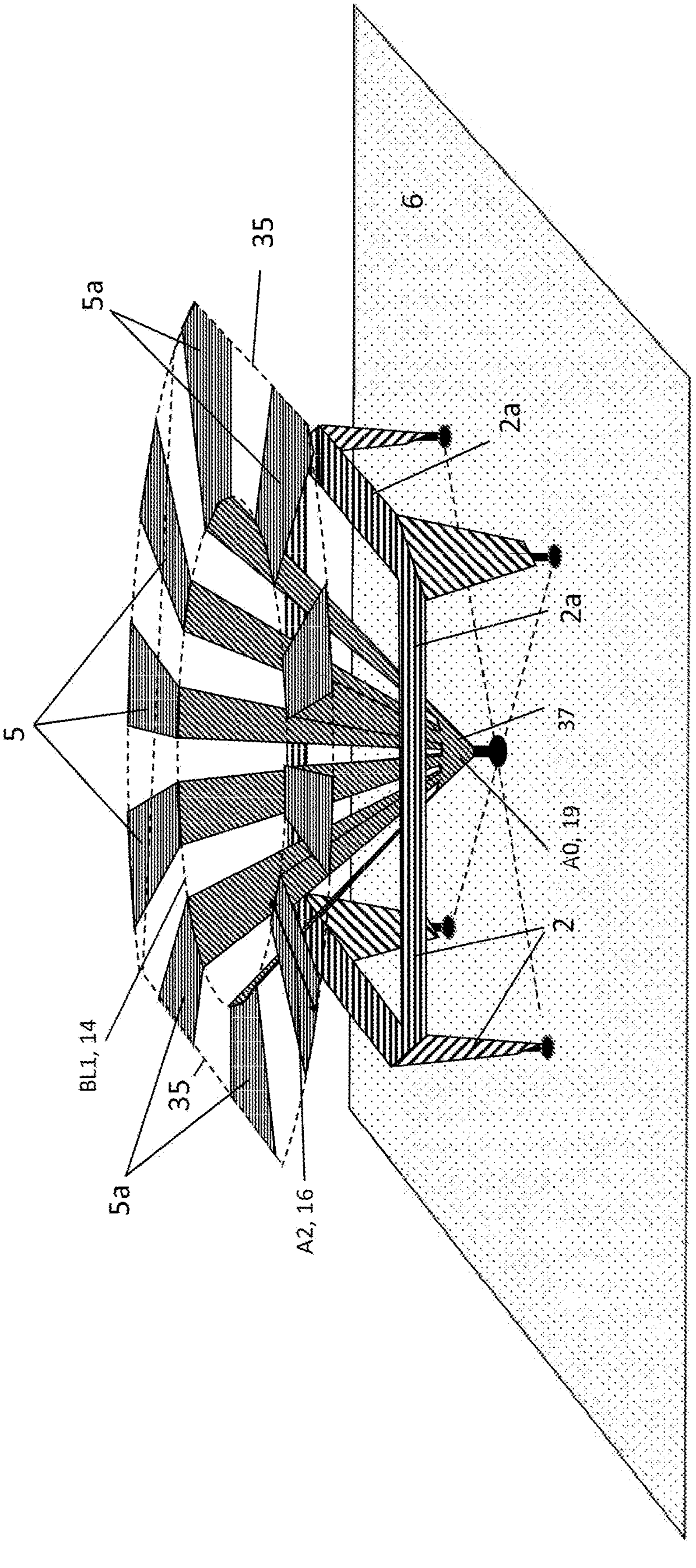
FIG. 9 shows a further embodiment of a combination antenna.

FIG. 10:

A tool for the embossing deep-drawing process 22 combined with a cutting tool 32 for cutting the planar cut film cutout, as described in FIG. 9. The cutting tool 32 consists of a cutting tool upper part 33 at the embossing stamp upper part 20 and a cutting tool lower part 34 at the embossing stamp lower part 23.

In the time following the embossing deep-drawing process 22, the shortening of the second section A2,16 of the circular surface segments 5*a* to be cut can take place by the cutting movement of the two cutting tools against one another.

FIG. 11: a)

Figure 10:
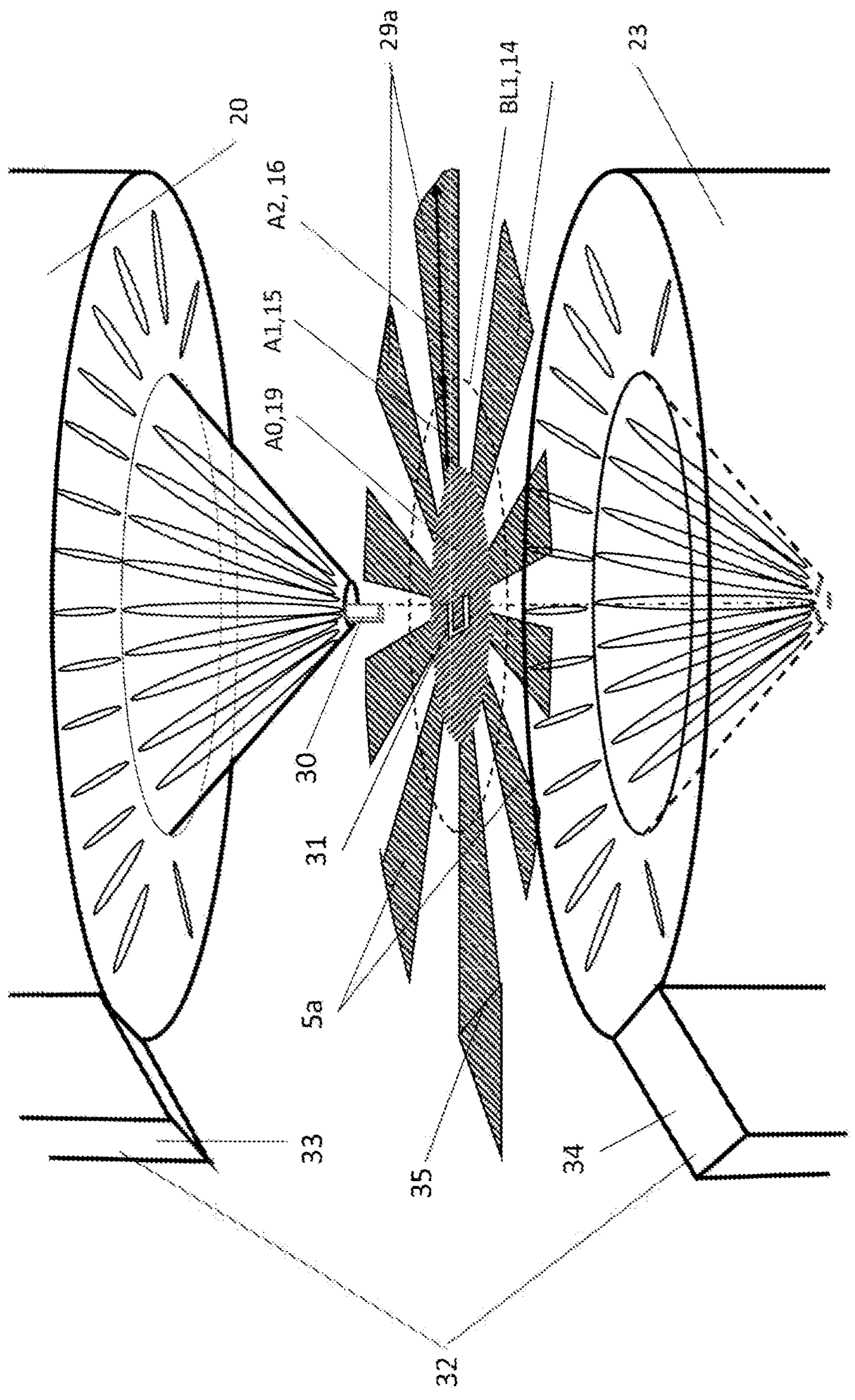
FIG. 10 illustrates a further tool for a deep-drawing process.

At the center of the film cutout 29, in order to form a cone with a closed jacket surface 37 and the monopole connector 3*a* in the first section A1,15 of the circular surface segments 5, a central surface element A0,19 is marked whose radius RA0 is at most equal to the first section A1,15. The cone is designed by deep-drawing the central surface element A0,19 by means of an embossing deep-drawing process 22—as described in FIG. 10—with the jacket length RA0. The cone can be given a uniform and very stable design all around by deep-drawing. The decisive factor here is to design the cone such that the periphery of the closed jacket surface of the cone—as required in accordance with the invention—does not exceed the value ¾ λ min at any point.

In addition, the embossing/deep-drawing process advantageously allows stiffening grooves 36 to be formed all around to stiffen the ramifications in the structure and to facilitate the conical shape. At the center of the central surface element A0,19, downwardly deflectable fastening pinnacles 31 are provided for fastening the monopole antenna 1 on a circuit board 40. The pinnacles are bent downwardly to jointly form, via cuts through the circuit board 40, the monopole connector 3*a* and to fix the monopole antenna 1.

In adaptation to a more rectangular antenna cover in the form of a plastic cover 46, provision is made to cut the second sections A2,16 of the circular surface segments 5 accordingly and to bend them slightly downwardly inclined along the first bending line BL1,14.

b)

A cross-section of a combination antenna 0 above an electrical circuit board 40 below a plastic cover 46. Due to the accurate fit of the plastic cover 46 with respect to the structure of the monopole antenna 1 in connection with transverse struts 61 on the plastic cover 46, the monopole antenna is held in a mechanically stable manner.

c)

Semi-manufactured and completely manufactured parts of the monopole antenna 1 can be stored stacked on top of one another in mass production—as shown—without getting caught in one another. This possibility is very advantageous in mass production, providing simple intermediate storage options and time savings.

FIG. 12*a:*

Figure 1B:
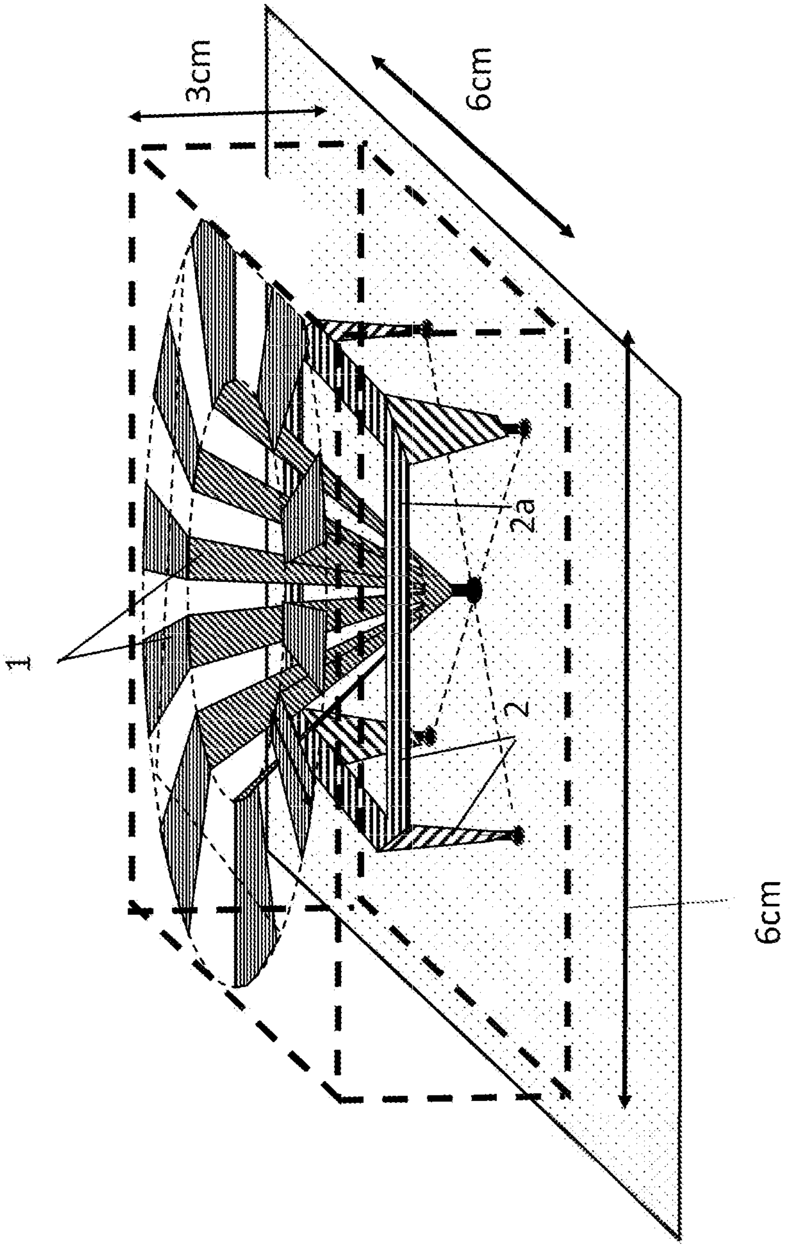
FIG. 1*b* shows a combination antenna inscribed on a cuboid.
Figure 11B:
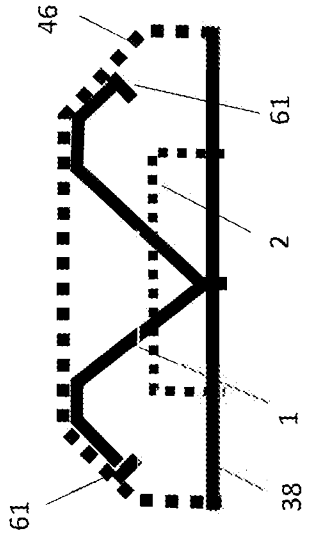
FIG. 11*b* shows a cross-section of a combination antenna above an electrical circuit board and below a plastic cover.
Figure 11C:
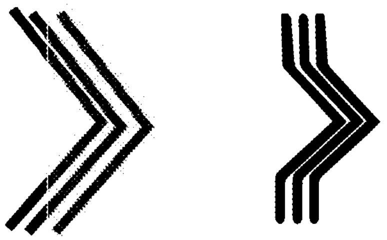
FIG. 11*c* illustrates stored parts of a monopole antenna stacked on top of one another.
Figure 11A:
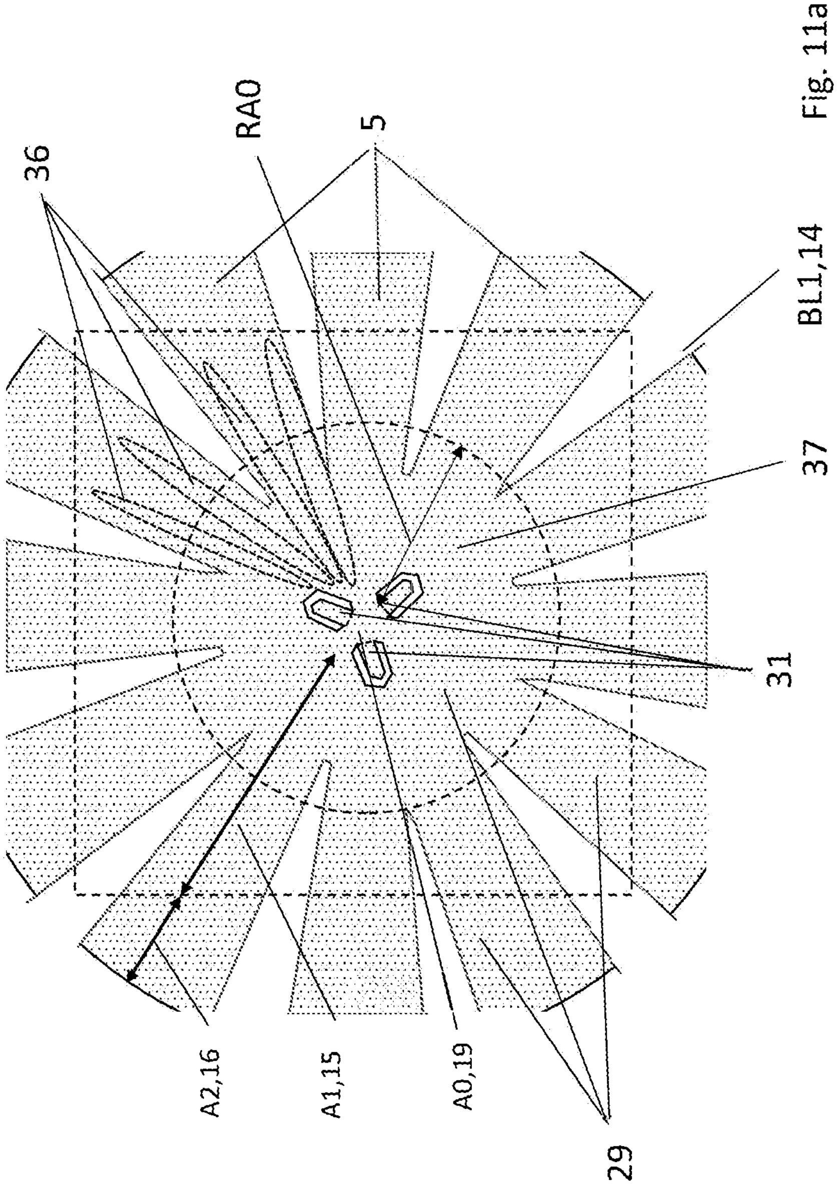
FIG. 11*a* shows a film cutout for forming a cone.

A film cutout 29 as in FIG. 1*a*) in connection with FIG. 11, but with radial slots 53 in the short outer edges of the circular surface segments 5 to reduce the widening width in order to observe the condition BS<Bs max, whose standard measure is ⅛ λ min, as the initial surface for the formation of the folding body. Due to a multiple use of this principle, slots of different lengths result.

FIG. 12*b:*

A film cutout 29 as in FIG. 1*a*) in connection with FIG. 11, but with roof pinnacles 54 in the first section A1,15 and radial slots 53 in the second section A 2,16 of the circular surface segments 5 as the initial surface for the formation of the folding body. In the embossing deep-drawing process 22, a cone with a partly fan-shaped cone jacket, whose surface line length is equal to the first section A1, 15, is provided by deep-drawing the inner region up to the first bending line BL1, 14 of the film cutout 29.

Along the bending line BL 1,14, the second section A2,16 is bent over, as in the other Figures, such that its surface is guided in parallel with the conductive base plane 6 to form the monopole roof capacity 4.

The roof pinnacles 54 are each formed longitudinally in the first section A1,15 of the circular surface segment 5 by an elongate pinnacle section 55. After forming the partly fan-shaped cone jacket from the film cutout 29, an increase in the size of the roof capacity 4 of the monopole antenna 1 is achieved in that the roof pinnacle 54 of each circular surface segment 5 is bent along the first bending line BL1,14 toward the central line such that the surface of the roof pinnacle 54 extends above the opening of the cone in parallel with the conductive base 6.

FIG. 13:

a)

A film cutout 29 as in FIG. 1*a*, wherein every other one of the circular surface segments 5 is designed in the azimuthal order as a circular surface segment 5*c* having a smaller segment radius Rc,8*c*. At the center of the film cutout 29, a central surface element A0,19 is marked—as in FIG. 11—to form a cone with a closed jacket surface 37 and with the monopole connector 3*a* in the first section A1,15 of the circular surface segments 5. The cone is produced by deep-drawing the central surface element A0,19 using the embossing deep-drawing process 22 together with the first sections A1,15 of the circular surface segments 5 having a large segment radius so that they are deflected against the central line by the deflection angle θ, 7 in the same way as the surface lines of the closed cone, wherein the periphery of the closed jacket surface of the cone—as required in accordance with the invention—at no point exceeds the value ¾ λ min. The shorter ends of the circular surface segments 5*c* are bent out with a larger deflection angle with respect to the central line so that a larger opening angle of the conical leaf structure is formed to support the higher frequencies in the 5G frequency band. The longer ends of the circular surface segments 5 are bent out at the first bending line BL1,14 to form the roof capacity—as described above—or kinked slightly downwardly.

b)

A combination antenna 0 for the 5G frequency range comprising the monopole antenna 1 conically connected at the center and having a radial monopole roof capacity 4 for the low band and a radial cone antenna part for the high band, formed from the film cutout 29, as described at a) above and the satellite antenna 2 having the ring line 2*a*.

FIG. 14:

a)

Figure 8:
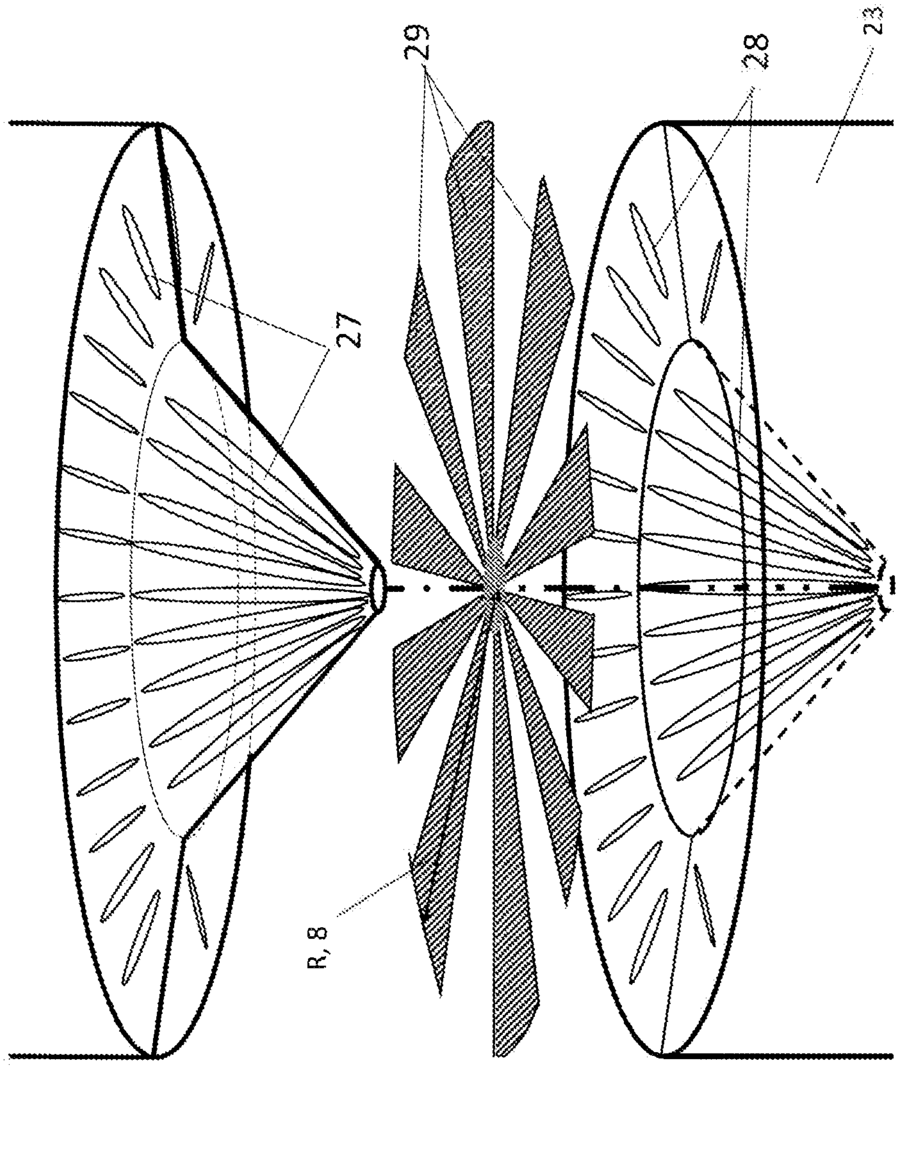
FIG. 8 shows a tool for a deep-drawing process.

A combination antenna 0 in accordance with the invention with a plastic cover 46 as a mechanical carrier of the areal structures of the monopole antenna 1. The inner shape of the plastic cover 46 includes a funnel shape and its inner surface includes a reproduction of the course of the areal structures in accordance with FIGS. 8, 9, and 11 of the monopole antenna 1. These areal structures are coated with an MID-compatible lacquer and are printed thereover with the areal structures of the monopole antenna 1 with the electrically conductive MID (Molded Interconnect Devices) structures 61. The inner connection of the cone apex as an antenna connection point 3, of the fourth section A 4,18 of the circular surface segment 5 to the electrically conductive base surface 6 can take place by a press contact or in pin form with soldering on the electrical circuit board.

b)

An outer view of the three-dimensional plastic cover 46 as in FIG. a) with areal MID structures 61 of the monopole antenna 1 printed on the inner side of a thin-walled cover. The printed MID structures are drawn on the outer side by reason of the clearer representation.

c)

Figure 14B:
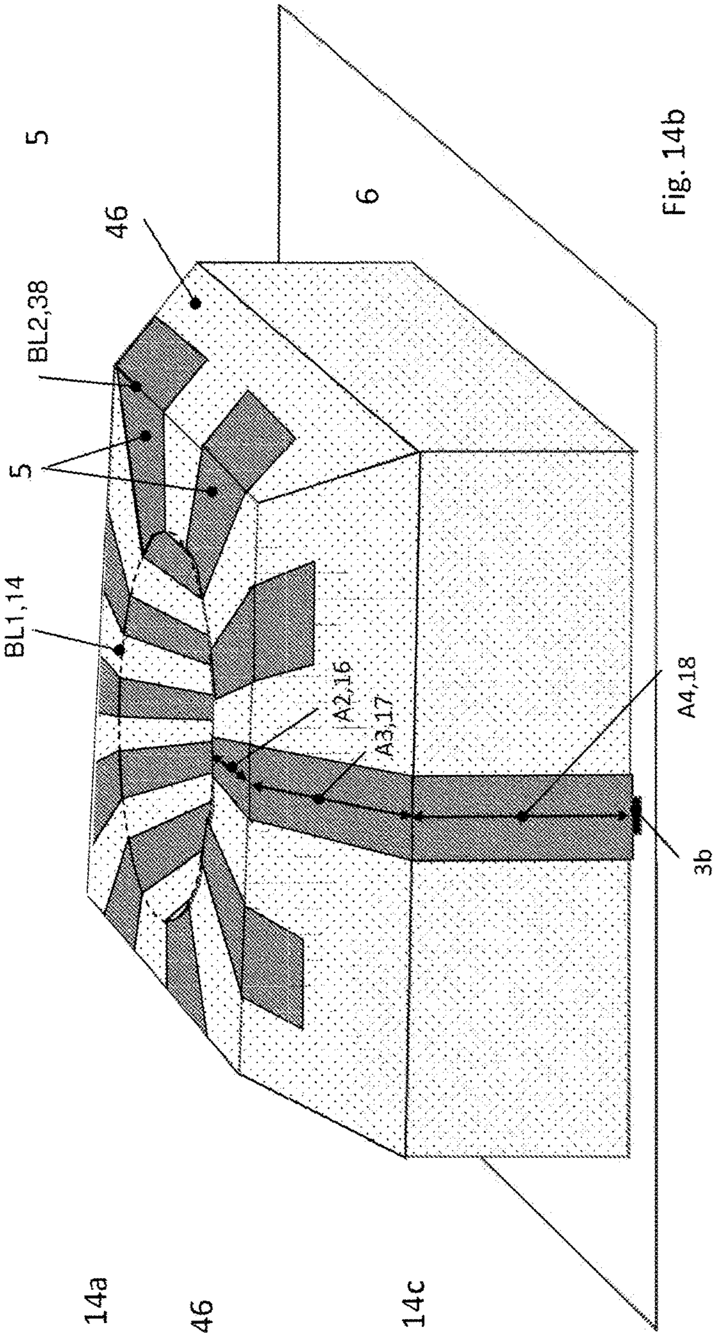
FIG. 14*b* shows an outer view of plastic cover of FIG. 14*a;*
Figure 14A:
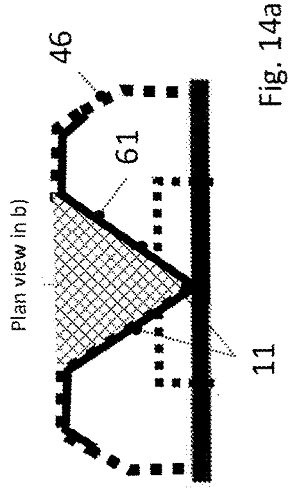
FIG. 14*a* illustrates a combination antenna with a plastic cover as a mechanical carrier.
Figure 14C:
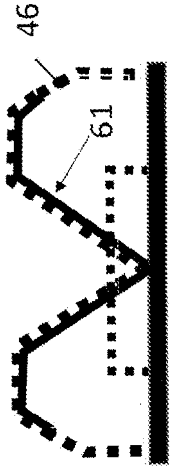
FIG. 14*c* shows a combination antenna with a plastic cover.
Figure 15:
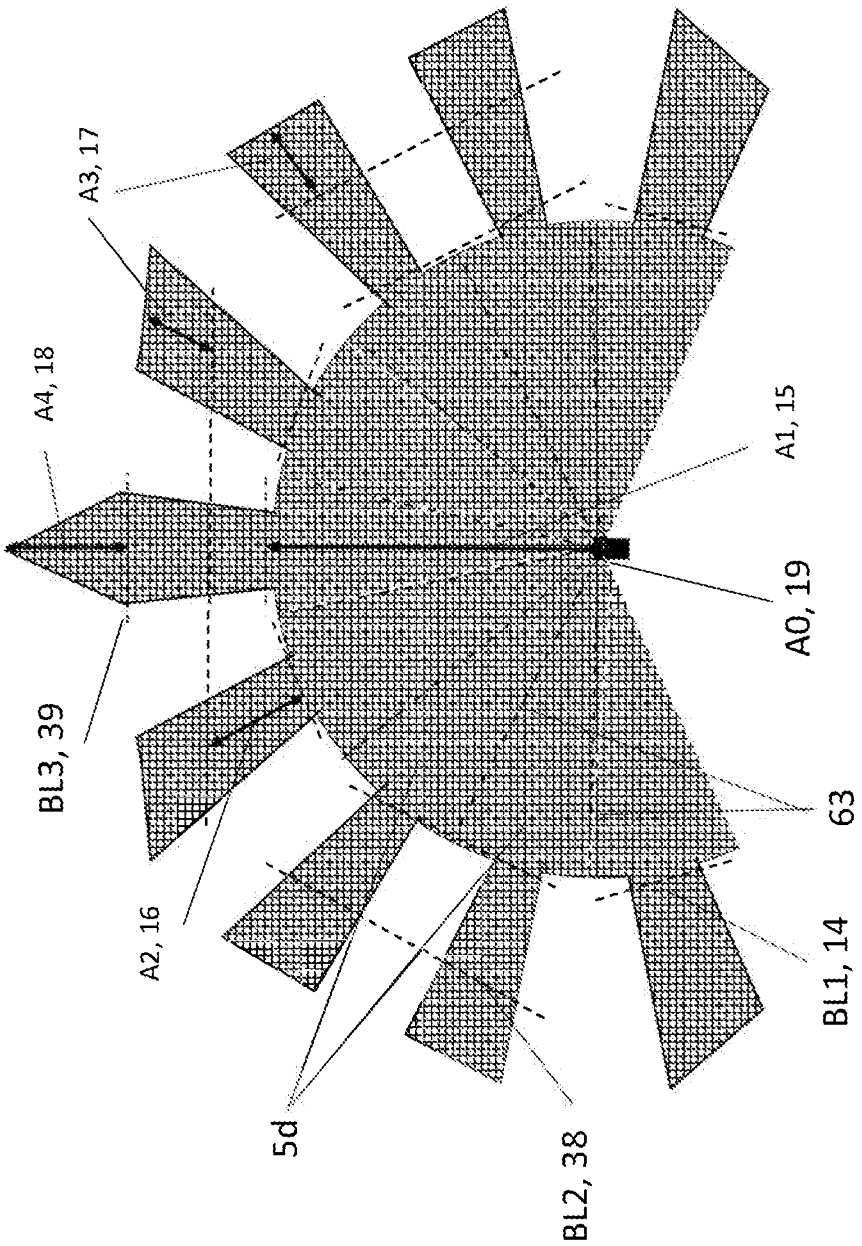
FIG. 15 shows a sectional view or cut away view for a further monopole antenna.

A combination antenna 0 as in FIG. 14, but with an outer surface designed as an antenna cover and an inner surface of the plastic cover designed as a mechanical carrier of the areal structures of the monopole antenna 1.

FIG. 15

A sectional view or a cutaway view for a monopole antenna 1 in the combination antenna 0 in accordance with the invention. The design of the monopole antenna 1 is based on a planar, rigid but flexible metal film or plastic film with a metallic coating shown here by way of example. In deviation from the circular sectional view in FIG. 2*a*, the formation of the monopole antenna 1 starts from the circular sector sectional view shown with N−1 marked sector fold lines 63 for indicating the boundary of the circular surface segments 5*d* laterally cut in the second, third and fourth sections (A2, 16, A3, 17, A4, 18). The sector fold lines 63 are arranged on the circular sector sectional image such that the circular surface segments 5*b* arranged between them are formed by bending along the sector fold lines 63 and are arranged azimuthally around the central line ZL so that the jacket of an N-angled pyramid standing on its apex and having a closed pyramid jacket is given. The second, third and fourth sections (A2, 16, A3, 17, A4, 18) are respectively formed by bending along the corresponding first, second and third bending lines (BL1, 14, BL2, 38, BL3, 39)—as explained in connection with the description of FIG. 4. The monopole connector 3*a* at the apex of the pyramid is given by the central surface element A0,19 from which the circular surface segments 5, which are connected at their tips via a central surface element A0,19, are cut out.

The advantages and the mode of operation of the invention are further explained below.

It is known from the theory of electrically small antennas that the potential of an antenna is to be considered as the ratio of Q=real part/imaginary part of the antenna impedance. For an antenna that is inscribed on a sphere having a radius a, the theoretical maximum of this potential with respect to the free-space wavelength of the radiation is given as the relationship Q=2 πa/λ^3. The maximum achievable potential grows with the third power of the spatial dimension related to the free-space wavelength and is thus unreasonably small. However, this theoretical maximum can furthermore only be reached when the antenna, with its structures, completely fills the available space in the sphere and the structural elements constructively contribute to the total radiation in their radiation effect.

The particular challenge in connection with the present invention is the predefined smallness of the cuboid on which the combination antenna for the 5G frequency range is to be inscribed compared to the largest wavelength at the lower limit of the 5G frequency range from fu=617 MHz to fo=5.9 GHZ. For example, if the height hm=3 cm and the footprint transverse extent=6 cm are predefined for the cuboid, the estimated radius a of a comparable sphere, on which the combination antenna is to be inscribed, amounts to approximately a=6.5 cm. In accordance with the relationship given above, the extreme ratio of the free-space wavelength λu=approx. 50 cm at the frequency fu to the sphere radius leads, due to the third power of the mismatch of a/λu, to a very small antenna potential of Q=0.014, which, however, is furthermore only attainable with theoretically optimally designed antenna structures in this space.

It is therefore decisive that the combination antenna 0 in accordance with the invention with its structure—as shown below—practically fulfills this condition in a particular manner and achieves—under the naturally predefined restriction—an optimum antenna potential. When considering the combination antenna 0 in accordance with the invention, as in FIG. 1*a*, it can be inscribed with its rotational symmetry on a cuboid having a square base surface with the described transverse extent and the height hm of the monopole antenna 1. This figure clearly describes that the combination antenna 0 in accordance with the invention, with its structures, extends in an optimal form completely over the space provided by the cuboid, wherein all the structural elements contribute constructively to the radiation formation.

Now, the particular advantage of the combination antenna 0 in accordance with the invention precisely also consists in the fact that the advantage is not only limited to the optimum design of the monopole antenna 1 with respect to its potential, but it is additionally possible, by the special design of the monopole antenna 1 in accordance with the invention, to place the satellite reception antenna 2 under its roof and to avoid the radiation shadowing through the special shape of the roof capacity. Figuratively speaking, the radiation of the satellite reception antenna 2 can penetrate the roof of the monopole antenna 0 that appears transparent to the satellite reception antenna 2.

A further advantage of the combination antenna 0 in accordance with the invention, which is decisive for mass production in large quantities for the vehicle industry, is the comparatively very simple manufacturing process of the monopole antenna 1 so that an economical manufacture is possible. If the monopole antenna 1 is designed from a self-supporting sheet metal film, it can also be manufactured, taking account of its complex shape, by stamping and bending processes to be performed in a simple manner. Even the serial intermediate storage of half-finished antenna molded parts can take place easily and without a snagging of the parts. The combination of the ring-shaped satellite reception antenna 2 with the monopole antenna 1 within the outline of the monopole antenna 1 can, due to the special coupling-free design of the monopole antenna 1 with the satellite reception antenna 2, advantageously take place without changing it.

LIST OF REFERENCE NUMERALS combination antenna 0
monopole antenna 1
satellite antenna 2
ring line 2*a*
antenna connection point 3
monopole connector 3*a*
ground connector 3*b*
monopole roof capacity 4
circular surface segment 5
cut circular surface segment 5*a*
circular surface segment with ground coupling 5*b*
short circular surface segment 5*c*
laterally cut triangular surface segment 5*d*
conductive base surface 6
deflection angle θ 7
segment radius R, 8
segment radius Rc, 8*c*
triangular segment height hs
width of the circular surface segments BS, 9
segment opening angle δ 10
remaining angle ε1, 10*a*
separation angle ε1 10*a*
outline GS 11
outline GD 11*a*
angle bisectors WH 12
radius bending line RBL 13
first bending line BL1,14
first section A1,15
second section A2,16
third section A3,17
fourth section A4,18
central surface element A0,19
embossing stamp upper part 20
antenna connection forming 21
tool for embossing/deep-drawing process 22
embossing stamp lower part 23
funnel with a conical jacket surface 24
embossing cone 25
horizontal embossing surface 26
raised embossing grooves for sheet metal stiffening 27
recessed counter-grooves for sheet metal stiffening 28
planar circular film cutout 29
planar cut film cutout 29*a*
plunger 30
fastening pinnacle 31
cutting tool 32
cutting tool upper part 33
cutting tool lower part 34
section line course 35
embossed stiffening grooves 36
closed conical jacket surface 37
second bending line BL2 38
third bending line BL3 39
electrical circuit board 40
frequency-dependent network 41
transformation circuit 42
connection point 43
areal roof star structure 44
roof circular surface segment 45
roof circular surface segments with ground coupling 45*b*
plastic cover 46
congruent bending line BL1*k*, 47
congruent bending line BL2*k*, 48
central connection surface 49
first roof section A1D, 50
second roof section A2D, 51
third roof section A3D, 52
radial slot 53
roof pinnacle 54
pinnacle cutout 55
radius of the central surface element RA0 56
inner bending line BL0 57
plastic support structure 58
inner surface of the plastic support structure 59
spherical radius R060
MID structures 61
jacket surface of the pyramid 62
sector fold line 63
free-space wavelength λ min of the highest satellite frequency
central line ZL
number of circular surface segments N
monopole height hm
ring line height hr
triangular segment height hs=stretched length from A1+A2
periphery of the pyramid jacket or cone jacket Upyr
running radius r
running width Br

The invention claimed is:

1. A combination antenna for 5G mobile communications and satellite reception for vehicles, comprising, above a common horizontal electrically conductive base surface, at least one broadband monopole antenna for the 5G frequency range having a monopole connection point and a height hm, where 1 cm<hm<5 cm, and a ring-shaped satellite reception antenna arranged concentrically thereto, wherein the combination antenna has the following features:

the satellite reception antenna is designed as a ring line radiator having a closed ring line at the height hr, where hr/hm<0.75, above the electrically conductive base surface for circularly polarized satellite reception;

the broadband monopole antenna is formed as a rotationally symmetrical and electrically conductive folding body of N circular surface segments, where 3<N<16, the circular surface segments are azimuthally uniformly distributed around a central line ZL of the combination antenna extending in a perpendicular manner through the monopole connection point, wherein the circular segment tips of all the circular surface segments are connected to one another and to the monopole connection point, each circular surface segment is inclined, starting from its tip, by a deflection angle θ with respect to the central line ZL, each circular surface segment is bent radially outwardly along a bending line BL1 located at the monopole height hm above the electrically conductive base surface and is guided in parallel with the electrically conductive base surface.

2. The combination antenna in accordance with claim 1, wherein the area enclosed by the largest periphery of the monopole antenna amounts to at least 80% of the area enclosed by the largest periphery of the satellite reception antenna, and/or it applies to a maximum width BS of the circular surface segments along the azimuth angle at every point: BS<⅛ λ min.

3. The combination antenna in accordance with claim 1, wherein adjacent circular surface sides of the circular surface segments form, radially within the bending line BL, an N-angled regular pyramid having a closed electrically conductive jacket surface.

4. The combination antenna in accordance with claim 1, comprising at least one of the following features:

the folding body is manufactured from a planar and self-supporting electrically conductive film or from sheet metal, the folding body is formed from a circular cutout, circular surface segments uniformly distributed over the azimuth are formed from a circular cutout by a film cutout N, the circular surface segments are connected at their tips via a central surface element A0, the angle bisectors WH of the circular surface segments are rotated about their tips such that they are angled out with respect to the central line ZL by the deflection angle θ, the circular surface segments are—starting from their tips—in each case in a first section A1 nestled against a cone jacket, virtually spanned by the angle bisectors WH, of a virtual cone jacket/pyramid jacket standing perpendicular on the tip at the monopole connection point and a closed cone apex/pyramid apex is manufactured as a monopole connector by mechanical deep-drawing of a central surface element A0, each circular surface segment is bent radially outwardly along a first bending line BL1 that is perpendicular to the angle bisector WH of said circular surface segment and that is located at the monopole height hm above the conductive base surface.

5. The combination antenna in accordance with claim 1, wherein the folding body is provided with embossed stiffening grooves.

6. The combination antenna in accordance with claim 1, wherein, to adapt the outline GD11*a* of the monopole roof capacity to an antenna cover in the second section A2, circular surface segments cut in accordance with a section line course are designed.

7. The combination antenna in accordance with claim 1, wherein a cone having a closed jacket surface and a monopole connector is designed by deep-drawing a central surface element A0 and downwardly deflectable fastening pinnacles for fastening the monopole antenna to a circuit board are provided at the center of the central surface element A0.

8. The combination antenna in accordance with claim 1, wherein, to increase the size of the monopole roof capacity, at least one circular surface segment is bent downwardly inclined about a second bending line BL2.

9. The combination antenna in accordance with claim 1, wherein at least one circular surface segment is kinked extending toward the conductive base surface and is conductively connected thereto at its lower end.

10. The combination antenna in accordance with claim 1, wherein an areal roof star structure is present, consisting of the same number N of star-shaped areal roof circular surface segments that start from a common central connection surface and whose surfaces are guided in parallel over the circular surface segments for capacitive coupling, wherein at least one of the areal roof circular surface segments deviates from the other roof circular surface segments such that, instead of its radial end, a section A3D is formed adjacent thereto that is kinked there at the bending line BL2*k*, extending toward the conductive base surface and that is conductively connected to the latter at its lower end.

11. The combination antenna in accordance with claim 1, wherein a plastic cover is provided which covers circular surface segments and at whose outer surface a roof circular surface segment is applied for capacitive coupling to these sections.

12. The combination antenna in accordance with claim 1, wherein a radial slot is provided in circular surface segments to reduce the widening width.

13. The combination antenna in accordance with claim 1, wherein every other one of the circular surface segments is designed in the azimuthal order as a circular surface segment having a smaller segment radius Rc for the additional formation of a shortened conical fan structure for supporting high mobile radio frequencies.

14. The combination antenna in accordance with claim 1, wherein a plastic cover is provided as a mechanical carrier of the areal structures of the monopole antenna, the inner shape of said plastic cover including a funnel shape and the inner surface of said plastic cover including a reproduction of the course of the areal structures of the monopole antenna, wherein these areal structures are coated with an MID-compatible lacquer and are printed thereover with the areal structures of the monopole antenna with the electrically conductive MID structures.

15. The combination antenna in accordance with claim 1, comprising at least one of the following features:

the monopole antenna is designed with respect to a minimum radiation coupling with the satellite reception antenna for the free-space wavelength λ min=18.75 cm at the upper GNSS frequency band for the satellite reception antenna, there are N=8 mutually identical circular surface segments, the monopole height amounts to hm=0.1*λ min, the deflection angle θ amounts to 0=30°, the segment radius R amounts to R=0.17*λ min, the segment opening angle δ amounts to 8=15°, the electrically conductive base surface is an electrical circuit board.

16. The combination antenna in accordance with claim 3, wherein the closed electrically conductive jacket surface has a largest periphery Upyr that is smaller than 0.8*λ min.

17. The combination antenna in accordance with claim 6, wherein the antenna cover is a rectangular antenna cover.

* * * * *